(12) United States Patent
Gupta et al.

(10) Patent No.: US 11,704,188 B2
(45) Date of Patent: Jul. 18, 2023

(54) APPARATUSES, COMPUTER-IMPLEMENTED METHODS, AND COMPUTER PROGRAM PRODUCTS FOR IMPROVED DATA EVENT ROOT CAUSE IDENTIFICATION AND REMEDIATION

(71) Applicants: ATLASSIAN PTY LTD, Sydney (AU); ATLASSIAN INC, San Francisco, CA (US)

(72) Inventors: Vipul Gupta, Banglore (IN); Nipun Aggarwal, East Udayrajpur (IN); Sandipan Biswas, East Udayrajpur (IN); Abhishek Gupta, West Bengal (IN)

(73) Assignees: ATLASSIAN PTY LTD, Sydney (AU); ATLASSIAN INC, San Francisco, CA (US)

( * ) Notice: Subject to any disclaimer, the term of this patent is extended or adjusted under 35 U.S.C. 154(b) by 14 days.

(21) Appl. No.: 17/644,988

(22) Filed: Dec. 17, 2021

(65) Prior Publication Data
US 2023/0195557 A1 Jun. 22, 2023

(51) Int. Cl.
*G06F 11/07* (2006.01)
*G06F 11/30* (2006.01)
*H04L 41/0631* (2022.01)

(52) U.S. Cl.
CPC ........ *G06F 11/079* (2013.01); *G06F 11/0772* (2013.01); *G06F 11/0793* (2013.01); *G06F 11/3006* (2013.01); *H04L 41/0631* (2013.01)

(58) Field of Classification Search
CPC .. G06F 11/079; G06F 11/0772; G06F 11/302; G06F 11/07; H04L 41/0631
See application file for complete search history.

(56) References Cited

U.S. PATENT DOCUMENTS

2009/0327195 A1* 12/2009 Iscen ...................... G06N 5/042
706/50
2020/0409780 A1* 12/2020 Balasubramanian ... G06F 9/547
(Continued)

FOREIGN PATENT DOCUMENTS

CN 115118621 A * 9/2022

OTHER PUBLICATIONS

Apparatuses, Methods, And Computer Program Products For Predictive Determinations Of Causal Change Identification For Service Incidents, U.S. Appl. No. 17/559,563.
(Continued)

*Primary Examiner* — Yolanda L Wilson
(74) *Attorney, Agent, or Firm* — Alston & Bird LLP

(57) ABSTRACT

Embodiments of the present disclosure provide improved identification and handling of root causes for data event(s). Some embodiments improve the accuracy of determinations of a root cause or likely order of root causes of a data event affecting any number of system(s), and cause transmission of data associated with such root cause(s) for use in triaging such data event(s) and/or facilitating efficient servicing to resolve the data event. Some embodiments utilize modified centrality algorithm(s) to efficiently and accurately identify a likely root cause of a data event in a computing environment. Some embodiments generate and/or output notifications that indicate the particular computing system(s) identified as a root cause of a data event, and/or the particular computing system(s) identified not as a root cause but affected by a data event of the root cause computing system.

20 Claims, 20 Drawing Sheets

(56) References Cited

U.S. PATENT DOCUMENTS

| | | | |
|---|---|---|---|
| 2021/0232485 A1* | 7/2021 | Agarwal | G06F 11/3419 |
| 2022/0172067 A1* | 6/2022 | Kang | G06F 11/3466 |
| 2022/0382621 A1* | 12/2022 | Banerjee | G06F 11/3006 |

OTHER PUBLICATIONS

Machine-Learning-Based Techniques For Determining Response team Predictions For Incident Alerts In A Complex Platform, U.S. Appl. No. 17/454,838.

Machine-Learning-Based Techniques For Predictive Monitoring Of A Software Application Framework, U.S. Appl. No. 17/127,216.

Machine-Learning-Based Techniques For Predictive Monitoring Of A Software Application Framework, U.S. Appl. No. 17/657,237.

Methods, Apparatuses And Computer Program Products For Generating Responder Alert Data Objects Based On Global Alert Policy Data Objects And Inline Alert Policy Data Objects, U.S. Appl. No. 17/448,615.

Methods, Apparatuses And Computer program Products For Generating Service Health Status Data Objects And Rendering Health Status Monitoring User Interfaces, U.S. Appl. No. 17/656,529.

Predictive Monitoring of Software Application Frameworks Using Machine-Learning-Based Techniques, U.S. Appl. No. 17/486,293.

\* cited by examiner

APPARATUSES, COMPUTER-IMPLEMENTED METHODS, AND COMPUTER PROGRAM PRODUCTS FOR IMPROVED DATA EVENT ROOT CAUSE IDENTIFICATION AND REMEDIATION

TECHNICAL FIELD

Embodiments of the present disclosure generally relate to identification of a likely root cause of a data event affecting one or more computing system service(s), and specifically to using specially configured centrality algorithms for efficiently and accurately identifying a root cause computing system service likely causing data event(s) affecting a computing system service, and/or upstream and/or downstream computing system service(s) based on a dependency with the root cause computing system service.

BACKGROUND

At any given time, a computing system may be experience or be affected by one or more event(s), error(s), or other data-driven occurrence(s) that occur due to operation of any of a number of device(s) within the an environment of interconnected computing systems. Such occurrences may affect one or more computing systems in any of a myriad of ways, with some occurrences being significantly more problematic for the operation of the environment as a whole. For example, when a computing system is affected by one or more error(s), functionality provided by the system may become unavailable. Additionally, in some contexts, an error affecting a particular computing system can cause further failure(s), error(s), and/or the like in other computing system(s) that depend or otherwise rely on the particular computing system experiencing the error. Applicant has discovered problems with current implementations for determining a root cause of determined data event(s), as well as how handling and remediation of such data event(s) and/or providing information associated with the root cause of the data event. Through applied effort, ingenuity, and innovation, Applicant has solved many of these identified problems by developing embodied in the present disclosure, which are described in detail below.

BRIEF SUMMARY

The appended claims herein serve as a summary of the disclosure.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
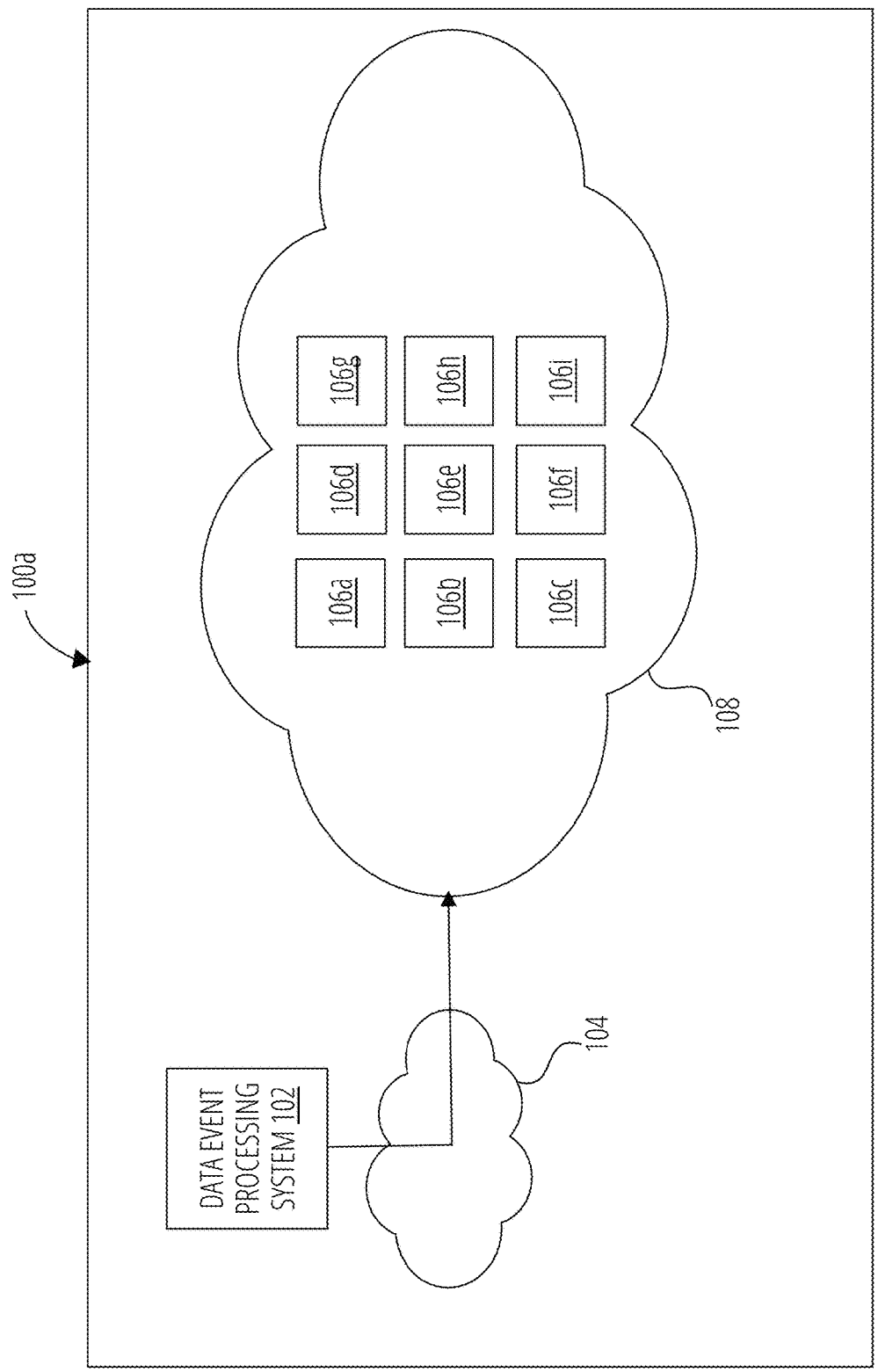
FIG. 1A illustrates a system for determining a root cause computing system service and generating data associated with servicing a root cause computing system service in accordance with at least some embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

In some embodiments, some of the operations above may be modified or further amplified. Furthermore, in some embodiments, additional optional operations may be included. Modifications, amplifications, or additions to the operations above may be performed in any order and in any combination.

Definitions

"Actual root cause" refers to a computing system service that experienced, caused, or otherwise triggers a data event affecting one or more computing system services in a computing environment.

"Affected computing system service" refers to a computing system service that is determined to be affected by a particular data event.

"Affected computing system service set" refers to electronically managed data identifying any number of affected computing system service(s) determined within a particular computing environment.

"Affected services subgraph" refers to electronically managed data identifying one or more node(s) corresponding to any number of affected computing system services in a computing environment, where each affected computing system service is affected by a particular data event or a set of data events.

"Affected status" refers to electronically managed data indicating that a computing system service is affected by a data event or a set of data events. A computing system service may be associated with an affected status due to a data event experienced by the computing system itself, or another computing system service that the computing system service is dependent on or otherwise associated with.

"Alert" refers to electronically managed data that indicates a data event experienced by a particular computing system service. An alert is generatable by any defined algorithm for detecting a data event, rule set, data-driven trigger, and/or other analysis process. Some embodiments detect an alert for a particular computing system service. Some embodiments receive data transmission(s) that embody an alert from other external computing system(s).

"Centrality algorithm" refers to one or more process(es) that identifies a node or an arranged list of nodes in a graph based on an importance for the node(s) determinable using one or more algorithm(s) that define importance. In some embodiments, a node's importance is defined based at least in part on connections between the node and/or other nodes, distance between nodes, or predefined importance assigned to certain nodes and connections therefrom. Non-limiting examples of a centrality algorithm includes, without limitation, include a VoteRank algorithm, a PageRank algorithm, a Betweenness algorithm, a Closeness algorithm, and a Degree-Based Algorithm.

"Complete set of computing system services" refers to electronically managed data that represents all computing system services that are a part of a particular computing environment.

"Computing environment" refers to a plurality of computing system services that provide a functionality or multiple functionalities alone and/or in conjunction with one another. A computing environment includes at least one computing system service that is dependent on another computing system service within the computing environment. Any number of computing system services within a computing environment may be dependent on any number of other computing system services within the environment.

"Computing system service" refers to one or more computer device(s) embodied in hardware, software, firmware, and/or any combination thereof, that provides particular functionality. A computing system service is connected with a computing device associated with an end user or another computing system service to operate as a dependency for the other computing device. Non-limiting examples of a computing system service includes one or more application server(s), end terminal(s), backend repository/repositories, and/or other computing device(s) embodying an application service or a microservice.

"Dependency" refers to a state of reliance by a first computing system service on another computing system service for the first computing system service to provide a particular portion of functionality. A first computing system service that relies on a dependency to a second computing system service (e.g., the second system service is a dependency of the first system service) indicates that the second computing system service must be functioning at least in part for the first computing system service to provide the particular portion of functionality that relies on the second system service. A computing system service that is "dependent on" a second computing system service has a dependency to the second computing system service.

"Dependency node" refers to a node that represents a computing system service embodying a dependency of another computing system service represented by another node. In some embodiments, a dependency node is indicated as a dependency of another node by particular data marking the dependency node, or particular data of an edge between a first node and the dependency node for that first node.

"Directed dependency graph" refers to any number of nodes that each represent a computing system service. Each node in the directed dependency graph is interconnected with one or more other nodes with particular data that indicates the dependency relationship between such nodes.

"Directed edge" refers to a directional graph edge that connects a parent node to a child node in a directed dependency graph. In some embodiments, the parent node where a directed edge begins represents a computing system service that is dependent on the computing system service represented by the child node where the directed edge terminates.

"Directed edge set" refers to electronically managed data representing any number of directed edges in a graph. A "directed edge set" associated with a particular node includes at least all the directed edges connected to that node. A "directed edge set" associated with a graph includes all directed edges in the graph.

"Next-most-likely root cause computing system service" refers to a computing system service determined to be most likely causing one or more data event(s) after consideration of one or more other computing system services at earlier positions in a prioritized root cause computing system service list. In some embodiments, a next-most-likely root cause computing system service is associated with the same likelihood as one or more preceding computing system services as being a root cause of a data event. In some embodiments, a next-most-likely root cause computing system service is indicated as less likely to be the root cause of a data event than the computing system service(s) represented at higher positions in the prioritized root cause computing system service list.

"Node" refers to a graph node that uniquely represents a particular computing system service in a computing environment. In this regard, each node corresponds to a particular computing system service.

"Node set" refers to electronically managed data representing any number of nodes.

"Notification" refers to electronically managed data that is human-readable and/or machine-processable by a service maintainer device, where such electronically managed data indicates a status of a computing system service and/or an indication of whether a computing system service has been determined as a root cause computing system service for a particular data event. In some embodiments, a notification includes electronically managed data representing how likely a computing system service is to be a root cause computing system service of a data event, and/or the position of the computing system service in a prioritized root cause computing system service list associated with a particular data event.

"Operations data" refers to electronically managed data associated with the functioning of a computing system service. Operations data is processable to determine whether the corresponding computing system service is experiencing a particular data event.

"Prioritized root cause computing system service list" refers to an ordered list of computing system services, where the order of the computing system services in the list is indicative of the likelihood in relation to one another that each of the computing system services is a root cause of a particular data event affecting or otherwise experienced by at least one computing system service in a computing environment.

"Priority for maintaining" refers to electronically managed data indicating an order by which computing system services are to be serviced to maximize the likelihood that an actual root cause is serviced earlier than one or more computing system service(s) that are affected by a data event caused by the actual root cause.

"Root cause computing system service" refers to a particular computing system service identified as having a highest likelihood of being an actual root cause with respect to a particular data event or set of data events. A root cause computing system service need not actually correspond to an actual root cause for a particular data event.

"Selectable node set" refers to electronically managed data that represents any number of nodes that can be selected, scored, or otherwise processed during a current iteration of a centrality algorithm. In some embodiments, a next-most-likely root cause computing system service is selected from a selectable node set for each iteration of a centrality algorithm.

"Data event" refers to electronically managed data that indicates a particular detectable state of operation, incident, event, software bug, or other data-driven determination associated with operation of a computing system service or group of computing system services. In some embodiments, a data event indicates an error experienced by a computing system service or a group of computing system services.

"Service maintainer device" refers to a computing device embodied in hardware, software, firmware, and/or any combination thereof, that is owned by, operated by, controlled by, or otherwise associated for use with a particular user in control of maintaining operation of a particular computing system service.

"Service monitored status" refers to electronically managed data representing a determination of whether a computing system service is affected by a particular data event. In some embodiments, a service monitored status represents whether a computing system service is operating within normal acceptable boundaries. In some embodiments, a service monitored status assigned to a particular computing system service is selectable from a set of possible affected statuses.

"System operations graph searching algorithm" refers to one or more process(es) that begins from a first computing system service represented by a first node in a directed dependency graph and utilizes the dependency relationships between the first computing system service represented by the first node in a directed dependency graph and other computing system services in a computing environment to determine at least one affected computing system service (e.g., embodying an affected computing system service set) indicating computing system services affected by a particular data event that may represent an actual root cause of the data event. In some embodiments, a system operations graph searching algorithm pings, detects, and/or otherwise requests data from a computing system service to determine a service monitored status associated with the particular computing system service.

"Unaffected status" refers to electronically managed data indicating that a computing system service is not affected by a particular data event.

Overview

The deployment of large service oriented cloud computing systems involves interdependent services and microservices that support a myriad of software features and applications. Indeed, some large computing systems may be comprised of topologies of 1,500 or more interdependent services and microservices. Such service oriented computing systems are nimble, highly configurable, and enable robust collaboration and communication between users at the individual, team, and enterprise level.

During operation of the interdependent computing system services, any of a myriad of data-driven events may occur. As these data events occur, they may affect any number of computing system services, including the computing system service that initially experienced the data event and/or one or more downstream (e.g., on which the computing system service experiencing the data event is dependent) or upstream computing system services (e.g., dependent on the computing system services experiencing the data event) computing system services associated therewith. Such data events may occur and be detected and/or tracked during normal operation of one or more computing system services. Additionally or alternatively, in some circumstances, data events are detected and/or tracked that indicate incident(s), error(s), or other negative aspects affecting operation of a computing system service and/or related computing system services.

Service oriented computing systems are affected by errors just like any other computing system. However, an error occurring in a particular service may affect any number of upstream and/or downstream computing system services in the complex and ever changing service topography of such a modern computing environment. For example, in a circumstance where a particular computing system service experiences a data event (e.g., a service error negatively affecting operation of the computing system service), the data event may cause one or more other effects at upstream and/or downstream computing system services dependent from the computing system service that experienced the data event. In this regard, a single data event can quickly diminish operations of several aspects of a complex computing environment, or diminish operations of the computing environment entirely without sufficient indication of what caused the now significant diminished operation of the computing environment as a whole.

A particular data event may be caused by any of a myriad of root causes. These causes may include error(s) isolated to a particular computing system service, error(s) experienced by a group of computing system services, errors occurring due to connections between multiple computing system services even though the isolated computing system services may be operating normally, and the like. In this regard, in several contexts identifying the actual root cause of a data event can be time consuming, may be resource intensive, may require undesirable system or service downtime, and/or otherwise may be impossible to perform with desired efficiency. Often, administrators, engineers, and/or other users are immediately deployed to attempt to fix a computing system service that such users are responsible for maintaining. However, in circumstances where the computing system service is affected by a data event but is not actually the root cause of the data event, any resources dedicated to analyzing, resolving, and maintaining operation despite the data event associated computing system service are entirely wasted. In this regard, it is desirable to improve the accuracy and efficiency by which an actual root cause of a data event is determined.

Embodiments of the present disclosure determine root cause computing system(s) representing computing system service(s) determined most likely to be the actual cause of a particular data event with improved accuracy and efficiency. Alternatively or additionally, some embodiments of the present disclosure determine a prioritized root cause computing system service list that indicates a subset or arrangement of computing system services determined most likely to be the root cause of a particular data event, and/or that indicates the probabilistic relationship between the likelihood that each identified computing system service is an actual root cause of a data event.

Some embodiments of the present disclosure determine a root cause computing system service and/or prioritized root cause computing system service list utilizing at least one centrality algorithm. Such centrality algorithm(s) identify a root cause computing system service based at least in part on an affected services subgraph representing the computing system services of a computing environment that are affected by a particular data event, where the computing environment is represented by a directed dependency graph including nodes and directed edges embodying dependency relationship(s) between the computing system services in the computing environment. Utilizing centrality algorithms that leverage graph processing, embodiments of the present disclosure identify the root cause computing system service and/or prioritized root cause computing system service list efficiently and with a simple implementation that functions accurately even at high numbers of computing system services and dependencies between them (e.g., hundreds and/or even thousands of computing system services in a single computing environment). For example, in some embodiments, the centrality algorithm is performed in —O(n) time, with n equaling the number of computing system services in the computing environment, such that the total time to identify a root cause computing system service or prioritized root cause computing system service list is proportional to linear time. In this regard, embodiments of the present disclosure reduce the complexity and time required to accurately identify the likely actual root cause(s) of a data event.

Some embodiments utilize the root cause computing system service, and/or prioritized root cause computing system service list, to provide further technical advantages. For example, in some embodiments, maintenance of the affected computing system services is initiated based on a probability that each affected computing system service is the actual root cause of a particular data event, as indicated by the root cause computing system service and/or prioritized root cause computing system service list. Some embodiments generate and/or transmit notification(s) that prompt maintenance of the affected computing system services according to a particular defined priority for maintaining such computing system services in the order determined to match the probability that each affected computing system service is the actual root cause. In this regard, embodiments cause initiation of maintenance for an affected computing system service determined most likely to be the root cause of a data event before causing initiation of maintenance for an affected computing system service determined as second most likely to be the root cause of the data event. By not generating and/or transmitting messages to each computing system service, embodiments of the present disclosure conserve computing resources that would otherwise be wasted in generating and/or transmitting messages regarding computing system services that are not likely causes.

Some embodiments cause initiation of maintenance of the second affected computing system service only once the first affected computing system service determined most likely to be the root cause of the data event has been completed and the data event remains affecting one or more computing system services. In this regard, such embodiments deploy resources for maintaining affected computing system service(s) in a manner that reduces waste of resources on maintaining affected computing system services unlikely to truly be an actual root cause of a data event. Additionally or alternatively, some embodiments improve the mean time to resolve data event(s) by initiating maintenance for the affected computing system services accurately determined to most likely be the actual root cause of said data event(s), thus improving uptime of the computing environment and individual computing system services therein by reducing the time required at each step of identifying and maintaining a likely root cause. Additionally or alternatively still, in some embodiments notification(s) is/are transmitted only when affected computing system service(s) are previously confirmed to not be the actual root cause, thus reducing disruption caused across all affected computing system services in the on-call process for maintaining each of such affected computing system services by respective maintenance entities.

Some embodiments utilize a graph representation of a computing environment to provide a myriad of additional and/or alternative technical advantages. For example, by maintaining a graph representation of a computing environment and dependencies between said computing system services, embodiments of the present disclosure can efficiently represent a large number of computing system services and efficiently process such a large number of computing system services. Additionally or alternatively, as computing system services spin up and/or wind down, the directed dependency graph may be efficiently updated to reflect such changes in the computing environment. Additionally or alternatively still, some embodiments enable processing of alert(s) in a non-isolated manner, accounting for upstream and/or downstream computing system services as opposed to considering each computing system service in isolation. In this regard, the relevance of a particular alert at one computing system service to another computing system service can similarly be determined and utilized to generate and/or transmit messages when appropriate to such upstream and/or downstream computing system service(s).

Example Systems and Apparatuses of the Disclosure

FIG. 1A depicts an example system 100a configured for determining a root cause computing system service and generating data associated with servicing a root cause computing system service in accordance with at least some embodiments of the present disclosure. Specifically, the system 100a includes an data event processing system 102 in communication with a computing environment 108 over a communications network 104. The computing environment 108 includes any number of computing system services, of which one or more computing system service(s) depend on one or more other computing system service(s) of the computing environment 108. For example, as illustrated, the computing environment 108 includes at least computing system service 106a through computing system service 106i.

Each computing system service of the computing system service 106a through computing system service 106i includes one or more computing device(s) embodied in hardware, software, firmware, and/or any combination thereof. In some embodiments, a computing system service includes a server, end-user computing terminal, processing device (e.g., a central processing unit or "CPU"), or other hardware that is specially configured via firmware and/or software executed thereupon to perform particular process(es). The process(es) configure the computing hardware to provide particular functionality defined by the process(es). In some embodiments, a computing system service is embodied virtually, for example in a virtual environment, virtual machine, and/or the like. In this regard, it will be appreciated that the computing system service may be embodied entirely in software. Additionally or alternatively, in some embodiments, a computing system service of the computing system service 106a through computing system service 106i is embodied by a cloud system, a partially cloud system (e.g., a cloud server communicating with one or more server(s) locally controlled by a particular entity responsible for providing a particular portion of functionality), and/or the like.

The computing environment 108 includes any number of interconnected computing system services that, alone and/or in conjunction with one another, provide particular functionality to one or more end user(s) and/or intermediary systems (e.g., other computing system services). In some embodiments, the computing environment 108 embodies a computing architecture supporting a particular software application, where computing system service 106a through computing system service 106i each embody microservices (or an application which may include any number of sub-services) that provide particular functionality. In some embodiments, each computing system service of the computing system service 106a through computing system service 106i embodies a microservice that fulfills a particular portion of functionality, with each of the microservices functioning cooperatively to provide the complete functionality of a particular service and/or application. A particular end-user application may be dependent on any number of computing system services that enable the end-user application to provide particular functionality to the user, with each of those computing system services being further dependent on any number of other computing system services. In some embodiments, one or more computing system service(s) of the computing system service 106a through computing system service 106i utilize shared computing hardware, for example a single server, shared processor, shared database, and/or the like.

In some embodiments, the data event processing system 102 includes one or more computing device(s) embodied in hardware, software, firmware, and/or any combination thereof. For example, in some embodiments, the data event processing system 102 includes at least one server, the server specially configured via hardware, software, firmware, and/or a combination thereof, to provide functionality for determining a root cause computing system service for data event(s) associated with received alerts. In some embodiments, the at least one server is specially configured based on one or more specially programmed software applications that provide such functionality. Additionally or alternatively, in some embodiments, the data event processing system 102 includes at least one end user computing terminal, backend system, and/or the like.

In some embodiments, additionally or alternatively, the data event processing system 102 includes at least one data repository. The at least one data repository includes at least one computing device embodied in hardware, software, firmware, and/or any combination thereof, that temporarily and/or permanently stores data generated, received, and/or otherwise utilized by the data event processing system 102. In some embodiments, the at least one data repository embodies a non-transitory computer memory, which is configured to read and/or write data such as user data, data representing dependencies between computer computing system services, computing environment identification data and/or access data (e.g., to communicate with one or more computing system services of a computing environment), and/or the like. In some embodiments, the at least one data repository is embodied by a database embodied in hardware (e.g., an encrypted and/or physically secured drive) configured with particular firmware, entirely in software (e.g., a virtual database, DBMS, and/or the like), a cloud database, and/or the like.

In some such embodiments, a data repository of the data event processing system 102 is accessible to a server of the data event processing system 102 to enable the server to store data to the data repository, retrieve data from the data repository, and/or otherwise manage data within the data repository. In some embodiments, for example, the data event processing system 102 utilizes a database to store data identifying a particular computing environment, store data for accessing a particular computing environment, store alert(s) associated with data event(s) affecting at least one computing system service in a computing environment, and/or the like. Additionally or alternatively, in some embodiments, the server retrieves one or more portions of stored data to provide the functionality described herein for identification of a root cause of a data event, for example to identify computing environments to monitor, determining dependencies between computing system services of the computing environment, generating and/or processing directed dependency graphs for root cause computing system service identification, and/or the like. Additionally or alternatively, in some embodiments, the server accesses a database of the data event processing system 102 to store data identifying service maintainer device(s) associated with a particular computing system service and/or user(s) associated with such service maintainer device(s), and/or retrieves the data identifying service maintainer device(s) associated with a particular computing system service (e.g., for use in transmitting one or more notifications as described herein).

In some embodiments, the data event processing system 102 communicates with one or more computing system service(s) of the computing environment 108 over the communications network 104. The communications network 104 may embody any of a myriad of network configurations. In some embodiments, the communications network 104 embodies a public network (e.g., the Internet) in whole or in part. In some embodiments, the communications network 104 embodies a private network (e.g., an internal network between particular computing devices) in whole or in part. In some other embodiments, the communications network 104 embodies a hybrid network (e.g., a network enabling internal communications between particular connected computing devices and external communications with other computing devices). The communications network 104 may include one or more base station(s), relay(s), router(s), switch(es), cell tower(s), communications cable(s) and/or associated routing station(s), and/or the like. In some embodiments, the communications network 104 includes one or more user entity-controlled computing device(s) and/or other enterprise device(s) (e.g., an end-user's or enterprise router, modem, switch, and/or other network access point) and/or one or more external utility devices (e.g., Internet service provider communication tower(s) and/or other device(s)). In some embodiments, the data event processing system 102 and the computing system services of the computing environment 108 communicate over the communications network 104 to transmit and/or receive data used to identify dependencies between computing system services, receive an alert at the data event processing system 102 of a data event affecting a computing system service of the computing environment 108, and/or the like.

It will be appreciated that, in some embodiments, the data event processing system 102 is communicable with a plurality of computing environments. In some embodiments, the data event processing system 102 is communicable with a plurality of computing environments utilizing the same communications network 104, for example over the Internet, in whole or in part (e.g., in some embodiments having at least a portion of intermediary computing devices specific to the computing environment). In some other embodiments, the data event processing system 102 is communicable with a plurality of computing environments utilizing a dedicated and/or private network for each computing environment.

Figure 1B:
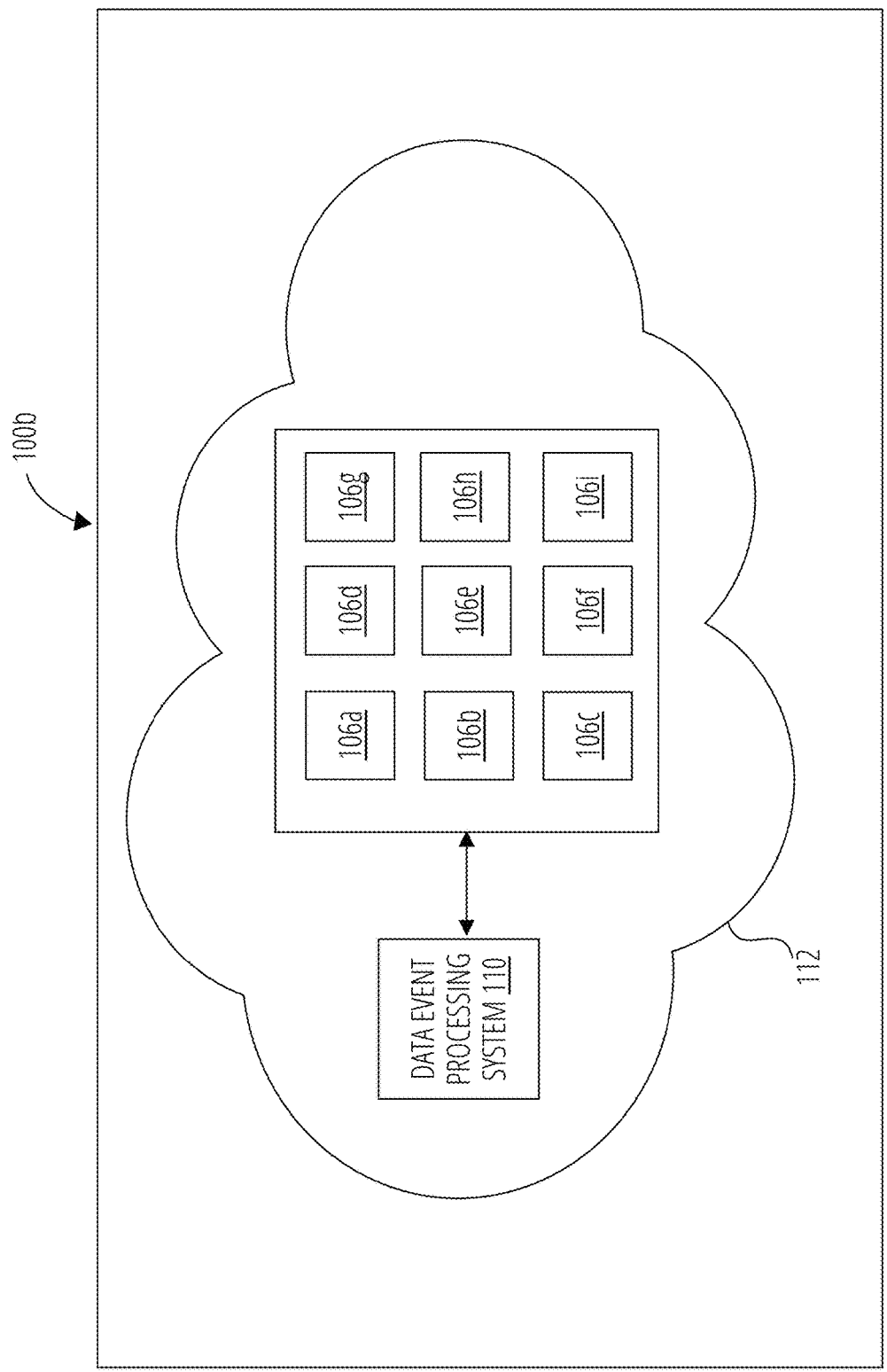
FIG. 1B illustrates another system for determining a root cause computing system service and generating data associated with servicing a root cause computing system service in accordance with at least some embodiments of the present disclosure.

In some embodiments, the data event processing system 102 is local to and/or embodied as a subsystem within the computing environment to be processed. In this regard, FIG. 1B illustrates another system for determining a root cause computing system service and generating data associated with servicing a root cause computing system service in accordance with at least some embodiments of the present disclosure. Specifically, FIG. 1B illustrates an example system 100b wherein an data event processing system 110 is positioned locally within a computing environment 112 to be processed by said data event processing system 110. In some such embodiments, the data event processing system 110 performs root cause identification functionality associated only with the computing system services of the computing environment 112. In this regard, the data event processing system 110 in some such embodiments represents a dedicated system for performing such functionality associated with the computing environment 112. Additionally, in some embodiments, the data event processing system 110 is controlled by the same entity that controls some or all of the computing system services of the computing environment 112. With respect to FIG. 1A, the entity that controls the data event processing system 102 may differ from the entity that controls some or all of the computing system services of the computing environment 108.

It will be appreciated that in some embodiments the data event processing system 110 performs the same functions as those described herein with respect to the similarly named data event processing system 102. However, in some such embodiments the data event processing system 110 communicates directly with one or more computing system service of the computing system service 106a through computing system service 106i in the computing environment 112. In this regard, the computing device(s) of the computing environment 112 are communicable communicate directly (e.g., over a private communications network) without exposing the computing device(s) to external computing devices that may pose cybersecurity threats to the individual computing device(s) and/or computing environment as a whole. Additionally or alternatively, in some such embodiments, the data event processing system 110 is capable of performing the root cause identification functionality described herein securely and without reliance on an external connection.

Figure 2:
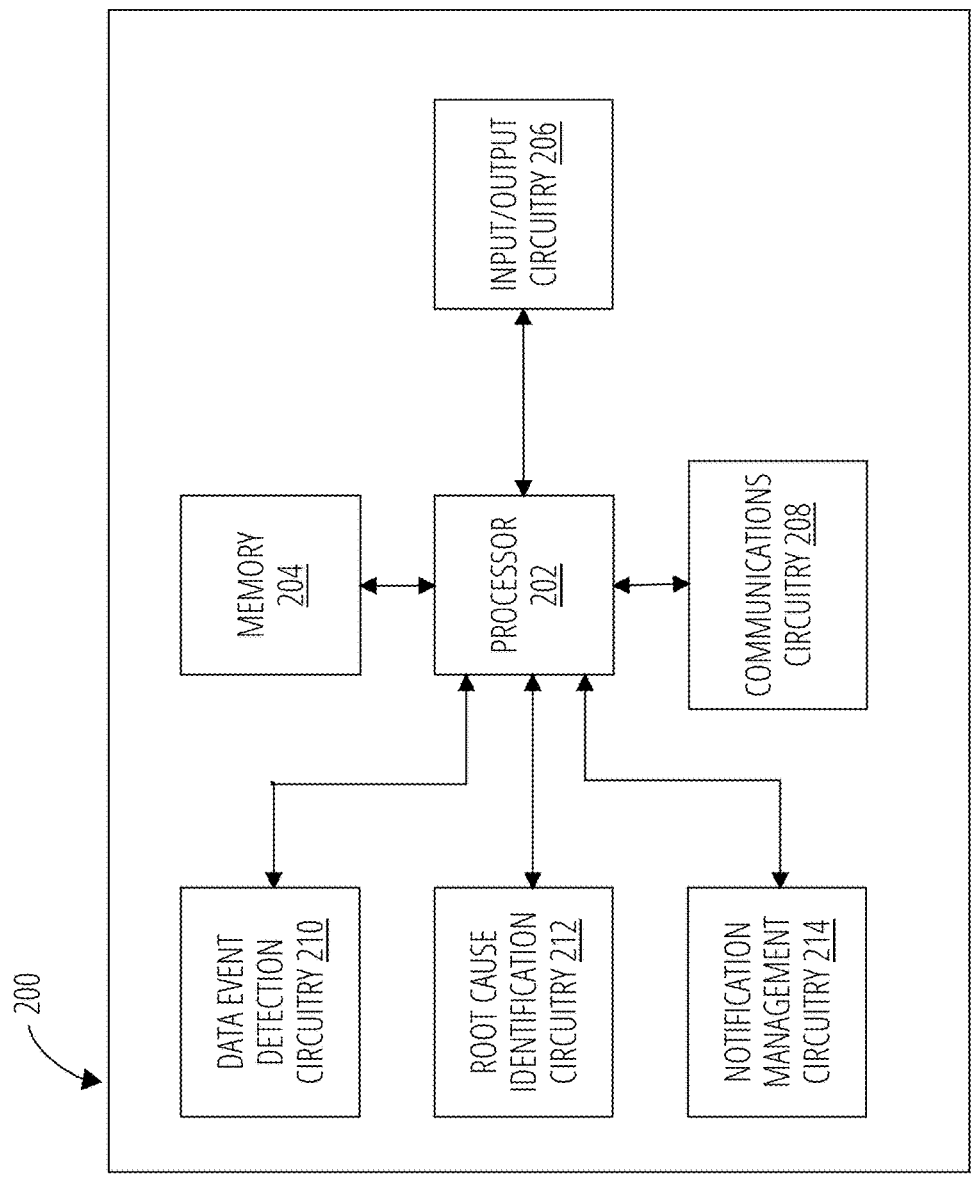
FIG. 2 illustrates a block diagram of an example root cause processing apparatus in accordance with at least some embodiments of the present disclosure.

FIG. 2 illustrates a block diagram of an example root cause processing apparatus in accordance with at least some embodiments of the present disclosure. In some embodiments, an data event processing system, such as the data event processing system 102 and/or data event processing system 110, is embodied by one or more computing devices such as the root cause processing apparatus 200 as depicted and described in FIG. 2. The root cause processing apparatus 200 includes processor 202, memory 204, input/output circuitry 206, communications circuitry 208, data event detection circuitry 210, root cause identification circuitry 212, and notification management circuitry 214. In some embodiments, the root cause processing apparatus 200 is configured, using one or more of the sets of circuitry embodying processor 202, memory 204, input/output circuitry 206, communications circuitry 208, data event detection circuitry 210, root cause identification circuitry 212, and/or notification management circuitry 214, to execute the operations described herein.

Although components are described with respect to functional limitations, it should be understood that the particular implementations necessarily include the user of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the root cause processing apparatus 200 provide or supplement the functionality of another particular set of circuitry. For example, the processor 202 in some embodiments provides processing functionality to any of the other sets of circuitry, the memory 204 provides storage functionality to any of other the sets of circuitry, the communications circuitry 208 provides network interface functionality to any of the other sets of circuitry, and/or the like.

In some embodiments, the processor 202 (and/or co-processor or any other processing circuitry assisting or otherwise associated with the processor) is/are in communication with the memory 204 via a bus for passing information among components of the root cause processing apparatus 200. In some embodiments, for example, the memory 204 is non-transitory and includes for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the root cause processing apparatus 200 to carry out various functions in accordance with example embodiments of the present disclosure.

In various embodiments, the processor 202 is embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the root cause processing apparatus 200, and/or one or more remote or "cloud" processor(s) external to the root cause processing apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with improved identification of a root cause, and/or most likely root cause(s), of a particular data event affecting one or more computing system service(s), for example as described with respect to operation of the data event processing system 102 and/or data event processing system 110, and/or as described further herein. In some embodiments, the processor 202 includes hardware, software, firmware, and/or a combination thereof, that detects a data event associated with at least one affected computing system service. Additionally or alternatively, in some embodiments, the processor 202 includes hardware, software, firmware, and/or a combination thereof, that generates a directed dependency graph associated with a computing environment. Additionally or alternatively, in some embodiments, the processor 202 includes hardware, software, firmware, and/or a combination thereof, that determines an affected computing system service associated with a data event by at least applying a system operations graph searching algorithm to a directed dependency graph. Additionally or alternatively, in some embodiments, the processor 202 includes hardware, software, firmware, and/or a combination thereof, that generates an affected services subgraph associated with an affected computing system service. Additionally or alternatively, in some embodiments, the processor 202 includes hardware, software, firmware, and/or a combination thereof, that determines a root cause computing system service associated with an affected computing system service, and/or a prioritized root cause computing system service list comprising at least an identified root cause computing system service. Additionally or alternatively, in some embodiments, the processor 202 includes hardware, software, firmware, and/or a combination thereof, that outputs one or more notification(s) to service maintainer device(s) associated with one or more computing system service(s).

In some embodiments, root cause processing apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202, and/or input/output circuitry 206 comprising a processor, in some embodiments is configured to control one or more functions of one or more user interface elements through computer program instructions (e.g., software and/or firmware) stored on a memory accessible to the processor 202 (e.g., memory 204, and/or the like). In some embodiments, the input/output circuitry 206 includes or utilizes a user-facing application to provide input/output functionality to a service maintainer device and/or other display associated with a user.

The communications circuitry 208 includes any means such as a device or circuitry embodied in either hardware or a combination of hardware and software that is configured to receive and/or transmit data from/to a communications network and/or any other computing device, circuitry, or module in communication with the root cause processing apparatus 200. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a service maintainer device in communication with the root cause processing apparatus 200.

The data event detection circuitry 210 includes hardware, software, firmware, and/or a combination thereof, that supports various functionality associated with detection of an alert of a data event. In some embodiments, the data event detection circuitry 210 includes hardware, software, firmware, and/or a combination thereof, that receives an alert associated with a particular data event affecting a particular computing system service. Additionally or alternatively, in some embodiments, the data event detection circuitry 210 includes hardware, software, firmware, and/or a combination thereof, that aggregates (in some embodiments, in real-time or near-real-time) operations data associated with functionality of a computing system service, and/or a group of computing system services. Additionally or alternatively, in some embodiments, the data event detection circuitry 210 includes hardware, software, firmware, and/or a combination thereof, that monitors at least one computing system service for data event(s) affecting any of the at least one computing system service(s). In some embodiments, the data event detection circuitry 210 includes hardware, software, firmware, and/or a combination thereof, that monitors (in some embodiments, in real-time or near-real-time) computing system service(s) for data event(s) based at least in part on processing the operations data associated with such computing system service(s). It will be appreciated that, in some embodiments, data event detection circuitry 210 includes a separate processor, specially configured field programmable gate array (FPGA), or a specially programmed application specific integrated circuit (ASIC).

The root cause identification circuitry 212 includes hardware, software, firmware, and/or a combination thereof, that supports various functionality associated with identifying a root cause of a data event, for example corresponding to an alert that was detected. In some embodiments, root cause identification circuitry 212 includes hardware, software, firmware, and/or a combination thereof, that generates and/or retrieves a directed dependency graph associated with a particular computing environment. Additionally or alternatively, in some embodiments, the root cause identification circuitry 212 includes hardware, software, firmware, and/or a combination thereof, that determines an affected services subgraph associated with a particular data event. Additionally or alternatively, in some embodiments, the root cause identification circuitry 212 includes hardware, software, firmware, and/or a combination thereof, that applies one or more system operations graph searching algorithm(s) to a directed dependency graph. Additionally or alternatively, in some embodiments, the root cause identification circuitry 212 includes hardware, software, firmware, and/or a combination thereof, that determines a root cause computing system service associated with a particular data event. Additionally or alternatively, in some embodiments, the root cause identification circuitry 212 includes hardware, software, firmware, and/or a combination thereof, that generates a prioritized root cause computing system service list associated with a particular data event. Additionally or alternatively, in some embodiments, the root cause identification circuitry 212 includes hardware, software, firmware, and/or a combination thereof, that maintains one or more centrality algorithm(s) for applying to a graph, for example an affected services subgraph. It will be appreciated that, in some embodiments, root cause identification circuitry 212 includes a separate processor, specially configured field programmable gate array (FPGA), or a specially programmed application specific integrated circuit (ASIC).

The notification management circuitry 214 includes hardware, software, firmware, and/or a combination thereof, that supports various functionality associated with generating, transmitting, and/or otherwise providing one or more notification(s) associated with a data event and/or root cause(s) associated therewith. In some embodiments, notification management circuitry 214 includes hardware, software, firmware, and/or a combination thereof, that determines one or more service maintainer device(s) associated with a computing system service. Additionally or alternatively, in some embodiments, the notification management circuitry 214 includes hardware, software, firmware, and/or a combination thereof, that generates a notification associated with an affected computing system service determined as a root cause computing system service. Additionally or alternatively, in some embodiments, the notification management circuitry 214 includes hardware, software, firmware, and/or a combination thereof, that generates a notification associated with an affected computing system service determined as not a root cause computing system service. Additionally or alternatively, in some embodiments, the notification management circuitry 214 includes hardware, software, firmware, and/or a combination thereof, that transmits and/or otherwise provides generated notification(s) to one or more service maintainer device(s) associated with a computing system service. It will be appreciated that, in some embodiments, notification management circuitry 214 includes a separate processor, specially configured field programmable gate array (FPGA), or a specially programmed application specific integrated circuit (ASIC).

It will be appreciated that, further in some embodiments, one or more of the sets of circuitries 202-214 are combinable. Alternatively or additionally, in some embodiments, one or more of the sets of circuitry 202-214 perform some or all of the functionality described associated with another component. For example, in some embodiments, one or more of the sets of circuitry 202-214 are combined into a single module embodied in hardware, software, firmware, and/or a combination thereof. For example, in some embodiments, two or more of the data event detection circuitry 210, root cause identification circuitry 212 and/or notification management circuitry 214 are embodied by a single set of circuitry that performs the combined operations of the individual sets of circuitry. Similarly, in some embodiments, one or more of the sets of circuitry, for example data event detection circuitry 210, root cause identification circuitry 212, and/or notification management circuitry 214 is combined with the processor 202, such that the processor 202 performs one or more of the operations described above with respect to each of these modules.

Example Computing Environment and Processing of the Disclosure

Figure 3:
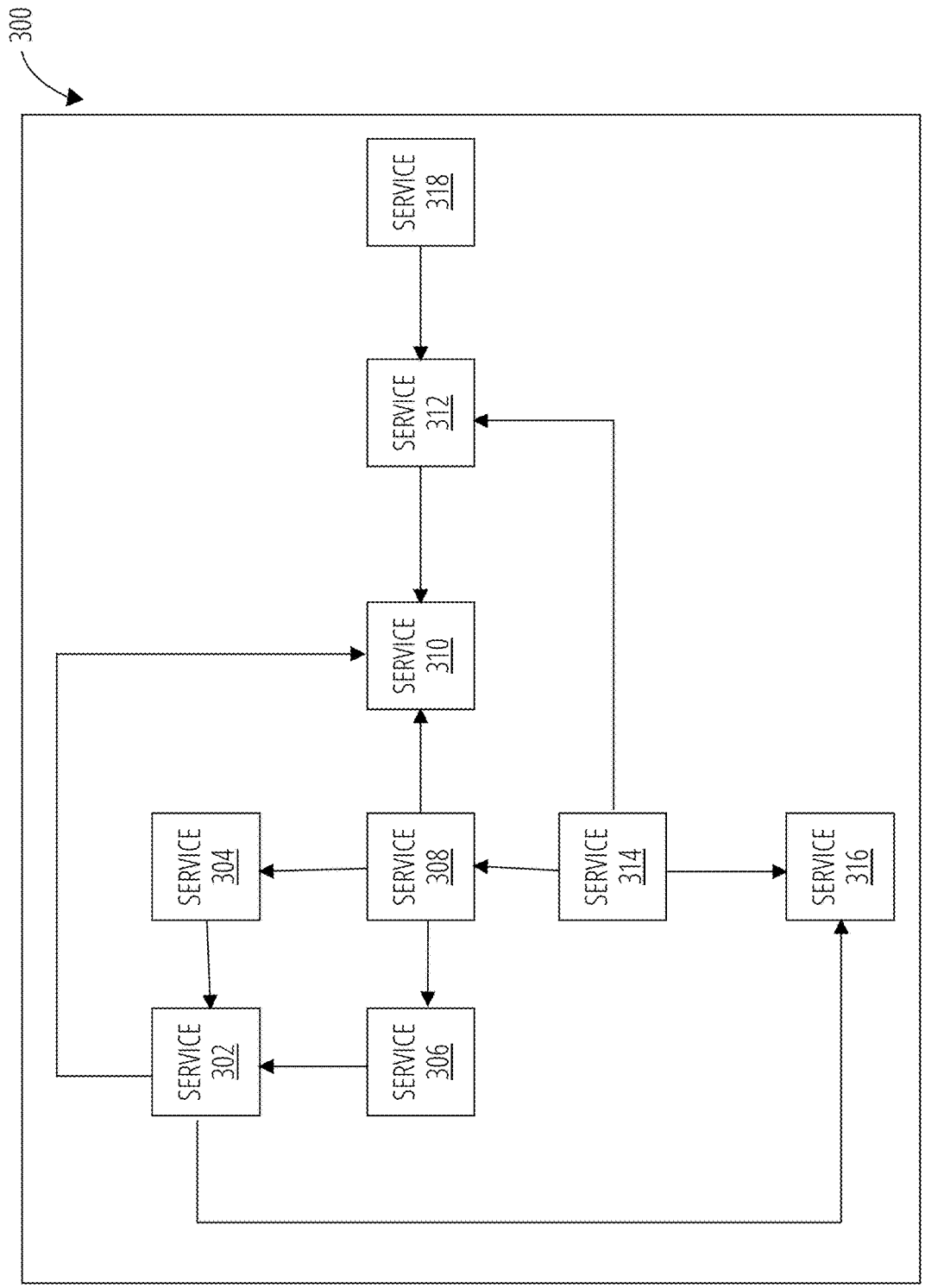
FIG. 3 illustrates a system diagram representing dependencies between computing system services of a computing environment in accordance with at least some embodiments of the present disclosure.

FIG. 3 illustrates a system diagram representing dependencies between computing system services of a computing environment in accordance with at least some embodiments of the present disclosure. Specifically, FIG. 3 depicts a computing environment 300 including a plurality of computing system services, with various computing system services in the plurality of computing system services dependent on one or more other computing system service in the computing environment 300. The plurality of computing system services includes computing system service 302 through computing system service 318. It will be appreciated that a computing system service may be dependent on another computing system service for any of a myriad of reasons. In some embodiments, a first computing system service is dependent on a second computing system service when the first computing system service accesses functionality of the second computing system service to complete functionality to be performed by the first computing system service. In some embodiments, a dependency is defined based at least in part on remote procedural call(s), application programming interface call(s), and/or other transmission(s) from a first computing system service to a second computing system service, where the result(s) of such RPC(s), API call(s), and/or transmission(s) are utilized by the first computing system service to complete one or more process(es) for providing particular functionality. Alternatively or additionally, in some embodiments, a dependency is defined at a computing system service level based at least in part on imported libraries, external program(s), and/or other link(s) between a first computing system service and a second computing system service that enables the first computing system service to access particular functionality of the second computing system service.

A dependency relationship between computing system services is determinable in any of a myriad of manners. In some embodiments, an data event processing system, for example embodied by a root cause processing apparatus 200, determines dependencies between computing system services of a particular computing environment. In some embodiments, for example, the root cause processing apparatus 200 transmits a query to each computing system service in the computing environment to interrogate the computing system service regarding its dependencies and/or associated dependent computing system services. In response to a query, the root cause processing apparatus 200 receives response data that indicates the dependencies for the computing system service that received the query. In some such embodiments, the root cause processing apparatus 200 performs such queries to update stored data representing the dependencies between computing system services of a particular computing environment in real-time. In some other embodiments, the root cause processing apparatus 200 updates data representing the dependencies between computing system services of a computing environment at particular time intervals, upon occurrence of particular triggering condition(s), and/or the like. In this regard, the root cause processing apparatus 200 in some embodiments consistently updates the information representing dependencies between the computing system services, and in some embodiments updates such dependency information in real-time or near-real-time to determine the most up-to-date dependency relationships between computing system services. In some example contexts, for example where the computing environment 300 includes a plurality of computing system services 302-318 that each represent a microservice that cooperate to provide particular service-level functionality, such up-to-date determination of dependency relationships between computing system services is especially advantageous as particular microservices may change as microservices are spun down, become unavailable, and/or the like. Alternatively or additionally, in some embodiments, the root cause processing apparatus 200 maintains and/or accesses a knowledge base (e.g., data stored in a database) that represents the dependencies between computing system services of a particular computing environment.

It will be appreciated that the computing system services in a computing environment and/or the dependencies between such computing system services may be determined utilizing any of a myriad of other methodologies. In some other embodiments, a services dependency graph is generated based at least in part on user input. For example, in some embodiments, a user graphically inputs the nodes and directed edges representing the computing system services and dependencies between said computing system services. In other embodiments, a user inputs data identifier(s), a structured data file, and/or the like that represents the computing system services and/or dependencies between them to be represented in a directed dependency graph.

In some other embodiments, the root cause processing apparatus 200 utilizes one or more data transmission(s) to identify dependencies between computing system services in a computing environment. For example, in some embodiments, the root cause processing apparatus 200 utilizes a data identifier that is propagated together with one or more transmissions throughout a computing environment to identify the dependencies between the computing system services. In some such embodiments, the data identifier is updated as each computing system service receives a data request, and/or transmits the data request or a corresponding data request. In some such embodiments, each computing system service injects one or more portion(s) of data identifying the computing system service into the propagated data identifier, such that the path travelled by a data request between computing system services is determinable from the data portions of the data identifier. Similarly, such propagated data identifiers may similarly be used to identify when a particular data request entered a computing environment from an external computing system, and/or the path travelled by a data request throughout an external computing system. Whether monitored by a central computing system service that monitors other computing system service(s) and/or monitored by each computing system service in a computing environment, it will be appreciated that root cause processing apparatus 200 may receive the propagated data identifier at one or more points throughout the computing environment (e.g., at one or more different computing system service(s)) and determine the dependencies between computing system services from data parsed from the propagated data identifier.

As illustrated, each dependency relationship between two computing system services is represented using a directional arrow that points from a computing system service to a dependency of that computing system service. In this regard, a directed arrow extends from a computing system service dependent on another computing system service to the other computing system service. For example, as illustrated, computing system service 318 is directionally connected to computing system service 312, indicating computing system service 318 is dependent on computing system service 312. Similarly, computing system service 312 depends on computing system service 310, as indicated by the directional arrow originating at computing system service 312 and terminating at computing system service 310. At the same time, computing system service 312 serves as a dependency for computing system service 314, as indicated by the directional arrow extending from the computing system service 314 and terminating at the computing system service 312. It will be appreciated that the dependencies for each of the depicted computing system service are determinable from the illustrated system in this manner.

From the depicted computing environment 300, it is readily determinable how data event(s) affecting a particular computing system service may cause various additional and related data event(s) in downstream and/or upstream computing system service(s). For example, a data event affecting computing system service 318 may be unlikely to affect any other computing system services in the computing environment 300, since no other computing system service is dependent on the computing system service 318 itself. In a circumstance where a data event affects computing system service 310, however, the data event may be likely to affect any or all of the computing system service(s) that depend on computing system service 310. For example in one example context, as depicted, a data event affecting computing system service 310 affects computing system service 308, computing system service 312, and/or computing system service 302, each of which depends on computing system service 310. Additionally, it will be appreciated that in some contexts data event(s) affecting a particular computing system service similarly affect further upstream and/or downstream computing system service(s) not directly dependent on the computing system service originally affected by the computing system service. For example, in a circumstance where computing system service 310 is affected by a data event, computing system service 318 is affected as a result of the data event, such as where the effects to computing system service 312 affect the performance of functionality upon which computing system service 318 depends.

In this regard, a single data event can greatly affect operation of the computing environment 300 as a whole. Additionally, in circumstances where the data event affects multiple computing system services (e.g., indirectly by virtue of dependency on another affected computing system service) it may be increasingly advantageous to accurately determine a root cause computing system service that, if restored to proper functionality, may restore one or more other computing system services to proper functionality (e.g., other computing system services that rely on the root cause computing system experiencing the data event). For example, by maintaining a root cause computing system service associated with a data event affecting a plurality of computing system services (e.g., with some computing system services affected indirectly by virtue of dependency), resources are conserved that would otherwise be expended to maintain all such computing system services in parallel in an attempt to resolve the data event quickly. Additionally, by accurately identifying a root cause computing system service, embodiments of the present disclosure enable maintaining of the root cause computing system service to resolve the data event more quickly, thereby improving overall uptime of the computing environment 300 as a whole in addition to improving uptime of each computing system service within the computing environment 300.

Figure 4:
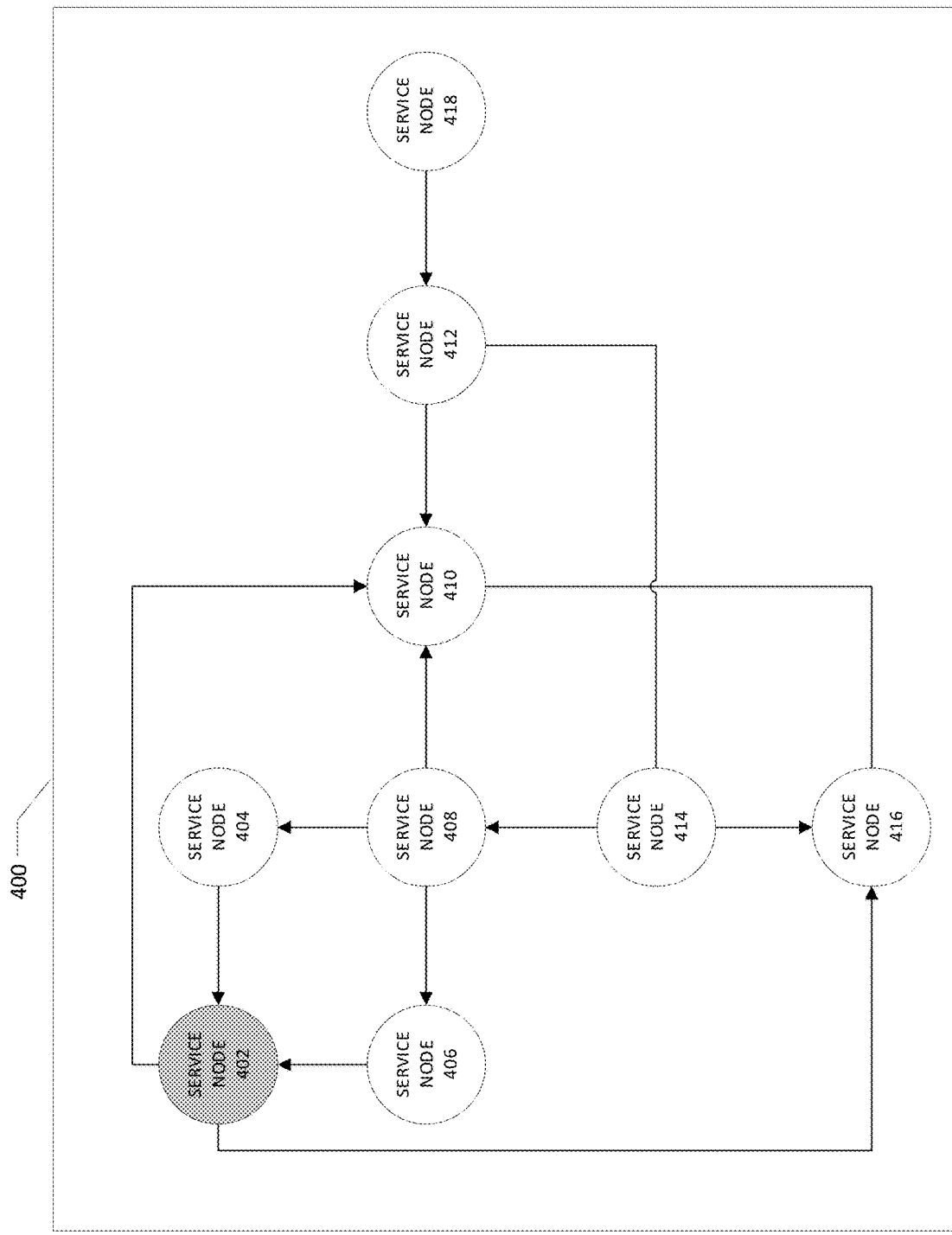
FIG. 4 illustrates an example directed dependency graph representing an example computing environment in accordance with at least some embodiments of the present disclosure.

FIG. 4 illustrates an example directed dependency graph representing an example computing environment in accordance with at least some embodiments of the present disclosure. Specifically, FIG. 4 depicts a directed dependency graph 400 representing the dependency relationships between the computing system services 302-318 of the computing environment 300 depicted and described with respect to FIG. 3. In some embodiments, the root cause processing apparatus 200 generates and/or maintains a directed dependency graph representing a particular computing environment. In some embodiments, the root cause processing apparatus 200 updates the directed dependency graph representing a particular computing environment in the circumstance where the root cause processing apparatus 200 determines and/or is notified that the computing environment has been updated or otherwise changed in any way.

Each computing system service in the computing environment 300 is represented by a node in the directed dependency graph 400. In some embodiments, each node (and/or associated computing system service) is maintained by the root cause processing apparatus 200 associated with particular data properties and one or more data value(s) corresponding to each data property. For example, in some embodiments, each node and/or associated computing system service is associated with (1) a data property that represents the dependencies for that node and/or associated computing system service, (2) a data property that indicates the service monitored status for the node and/or associated computing system service, (3) service maintainer device information corresponding for the node and/or associated computing system service, and/or the like. In some embodiments, the root cause processing apparatus 200 maintains the data values for each data property associated with a node and/or corresponding computing system service. It will be appreciated that, in this regard, the directed dependency graph 400 in some embodiments includes hundreds or thousands of nodes, such as in the circumstances where the number of dependencies between computing system services of a particular computing environment totals hundreds or thousands. As depicted, the directed dependency graph 400 includes nodes 402-418, each node representing a similarly numbered computing system service of the computing system services 302-318 of the computing environment 300 depicted and described with respect to FIG. 3.

The directed dependency graph 400 further includes a plurality of directed edges. Each directed edge represents a dependency relationship between a parent node (e.g., from which the directed edge originates) and a child node (at which the directed edge terminates). In this regard, the directed dependency graph 400 includes a directed edge that represents each parent node as having a dependency on a particular child node. For example, as illustrated, the computing system service 318 depends on computing system service 312, and similarly node 418 is indicated as depending on node 412. Thus, a directed edge extends from node 418 to node 412 in the directed dependency graph 400. Similarly, computing system services 304 and 306 each depend on computing system service 302, and thus nodes 404 and 406 each are indicated as depending on node 402. Thus, a directed edge extends from node 404 to node 402, and a second directed edge extends from node 406 to node 402. In this manner, in some embodiments the root cause processing apparatus 200 for example generates and/or maintains the directed dependency graph 400 based at least in part on dependency information representing the dependencies between each computing system service of a particular computing environment.

In some embodiments, the directed dependency graph 400 is processed for any of a myriad of purposes. For example, in some embodiments, the root cause processing apparatus 200 processes the directed dependency graph 400 based on the dependencies represented therein to monitor the service monitored status of each computing system service represented in the directed dependency graph 400. In this regard, in some embodiments the service monitored status represents whether the computing system service is currently affected by a data event that is impacting operations of the computing system service. As depicted in FIG. 4, the root cause processing apparatus 200 for example determines that the computing system service 302 (e.g., represented by the node 402) is operating normally and/or otherwise not affected by a data event at a particular timestamp, and thereby marks the node 402 accordingly (indicated by the light shading of node 402 in FIG. 4). In some embodiments, the root cause processing apparatus 200 marks a particular node with a particular status identifier (e.g., an unaffected status) for a status parameter to indicate that the corresponding computing system service is operating normally.

A directed dependency graph is further used to indicate an affected computing system service, and/or to identify a root cause computing system service associated with the data event and/or prioritized root cause computing system service list associated with the data event. In some embodiments, for example, the root cause processing apparatus 200 detects a data event associated with a particular computing system service. The root cause processing apparatus 200 in some such embodiments marks the node associated with the affected computing system service, indicating that operation of the affected computing system service is currently being affected by the data event. In some embodiments, for example, the root cause processing apparatus 200 detects and/or receives an alert indicating the data event as affecting a first computing system service. In some embodiments, the root cause processing apparatus 200 marks the node associated with the affected computing system service as affected by the data event, for example by marking the particular node with a different particular status identifier (e.g., an affected status) for a status parameter. Additionally or alternatively, in some embodiments, the root cause processing apparatus 200 marks the node representing the computing system service for which the alert was detected as the "alerting service" to store an indication of the particular computing system service for which an alert was originally detected.

Figure 5:
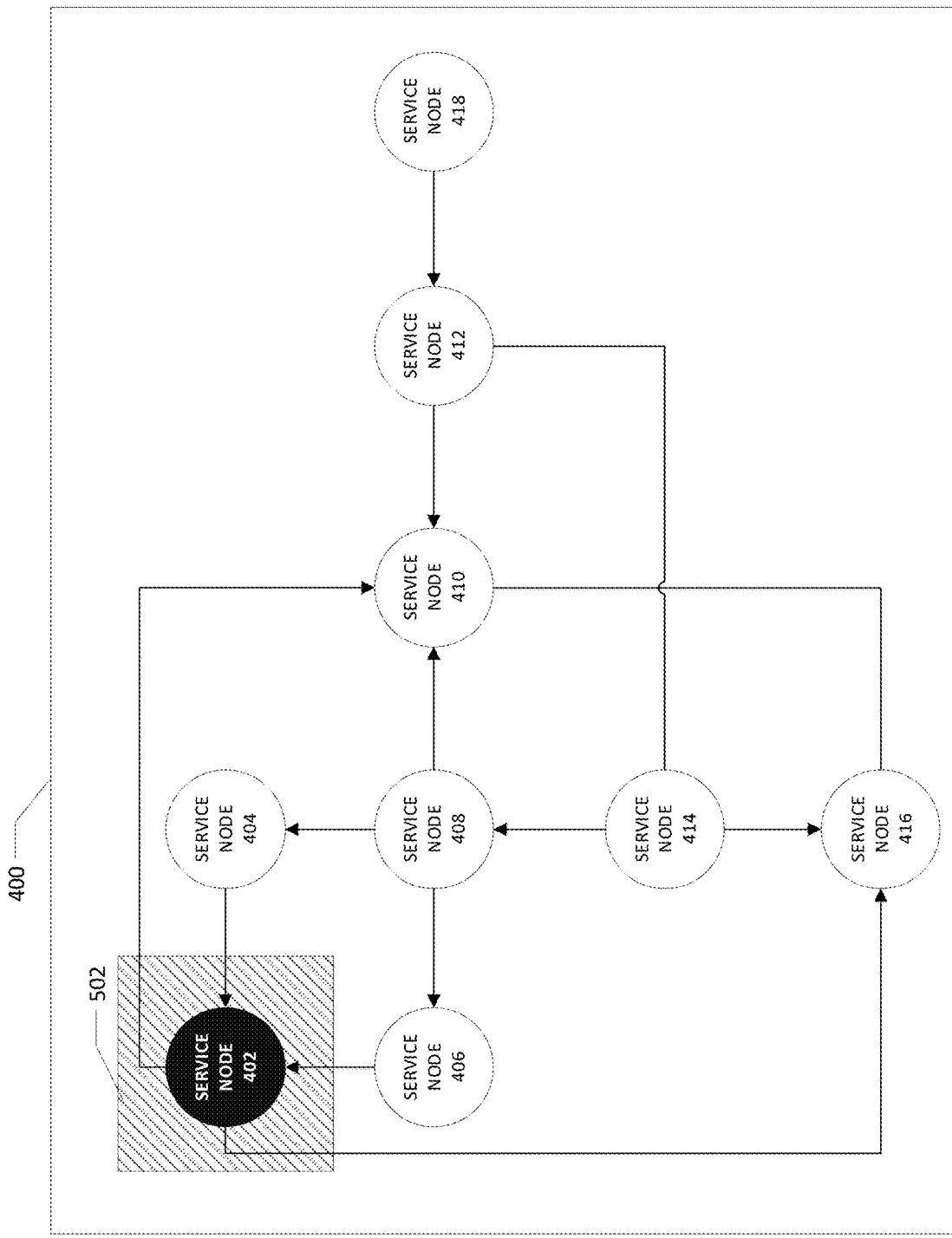
FIG. 5 illustrates an example visualization of a directed dependency graph representing an example computing system service alerting as affected by a data event in accordance with at least some embodiments of the present disclosure.

FIG. 5 illustrates an example visualization of a directed dependency graph representing an example computing system service alerting as affected by a data event in accordance with at least some embodiments of the present disclosure. Specifically, FIG. 5 depicts the directed dependency graph 400 with the node 402 darkly shaded to indicate marking of the node as corresponding to an affected computing system service. The node 402 further is depicted together with alerting element 502 representing a patterned box, indicating that the node 402 corresponds to the computing system service for which an alert was received. It will be appreciated that the alerting element 502 in other embodiments visually distinguishes the node for which an alert was received using any of a myriad of visual properties, including a particular extra element of a particular size, color, pattern, and/or the like, or by altering such properties of a representation of the node itself.

Additionally, the directed dependency graph 400 includes an element visually depicting the node 402 is associated with the computing system service for which an alert of a data event was originally received. As depicted in FIG. 5, the node 402 is surrounded by a diagonally patterned box that indicates the node 402 as associated with the affected computing system service for which an alert of a particular data event was originally detected. It will be appreciated that, in other embodiments, an affected computing system service is indicated utilizing one or more alternative visual identifier(s) to distinguish it from other node(s) (e.g., unaffected nodes and/or nodes corresponding to computing system services having statuses that have not yet been determined). Similarly, in other embodiments, the node corresponding to the affected computing system service for which an alert was originally detected is visually distinguished utilizing one or more alternative visual identifier(s). In this regard, the particular visualizations depicted in FIGS. 4 through 11 are not to limit the scope and/or spirit of this disclosure.

Figure 6:
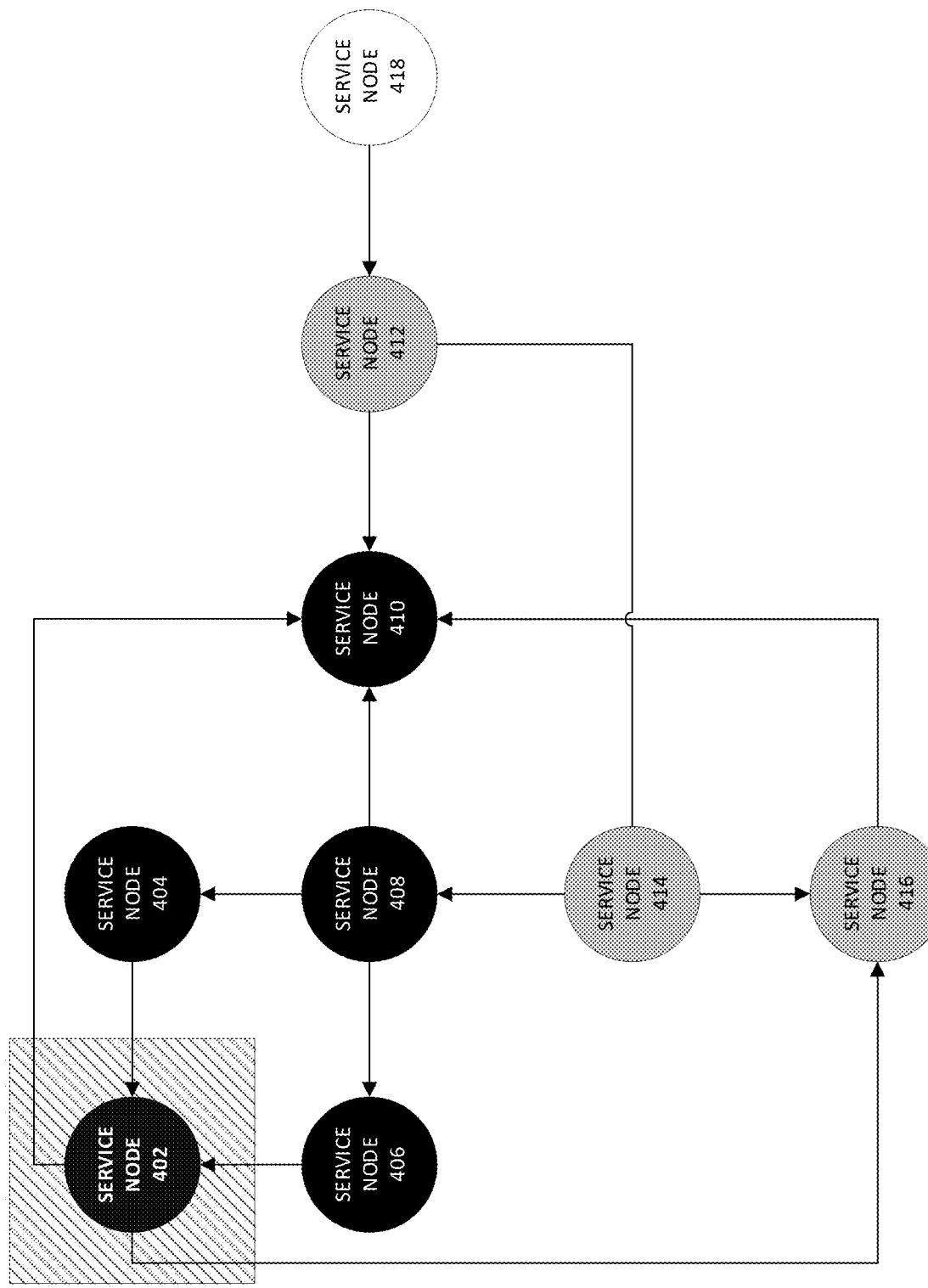
FIG. 6 illustrates an example visualization of a plurality of affected computing system services represented in a directed dependency graph in accordance with at least some embodiments of the present disclosure.

FIG. 6 illustrates an example visualization of a plurality of affected computing system services represented in a directed dependency graph in accordance with at least some embodiments of the present disclosure. The plurality of affected computing system services in some such embodiments represents an affected computing system service set. In this regard, the affected computing system service set comprises any number of computing system services determined to be affected by one or more data event(s). As depicted in FIG. 6, each affected computing system service in the affected computing system service set is represented by a corresponding node shaded in black. Each computing system service operating normally is shaded in gray. Further, each affected computing system service not checked for status is represented by a node depicted in white (e.g., not shaded).

In some embodiments, the root cause processing apparatus 200 determines and/or maintains the affected computing system service set associated with a data event, and/or generates the directed dependency graph representing such an affected computing system service set. For example, in some embodiments, the root cause processing apparatus 200 performs a system operations graph searching algorithm that determines a service monitored status for each computing system service in a particular algorithmic manner. In this regard, the system operations graph searching algorithm iteratively searches through the directed dependency graph generated representing the computing environment to determine the service monitored status of each computing system service represented by a node therein. In some embodiments, the system operations graph searching algorithm iteratively checks the service monitored status of each computing system service based on the dependencies between such computing system services, and terminates a particular iteration of the system operations graph searching algorithm once a computing system service associated with an unaffected status (e.g., operating normally) is identified. In this regard, terminating such an iteration of the system operations graph searching algorithm upon determination of an unaffected status advantageously enables marking of a subgraph to localize the likely candidates to be a root cause computing system service for a particular data event, and further advantageously conserves computing system resources that would otherwise be unnecessarily expended to query the status for each computing system service in a computing environment. It will be appreciated that the root cause processing apparatus 200 in some embodiments determines the service monitored status for a particular computing system service based at least in part on direct queries and/or communication with the computing system service, and in other embodiments the root cause processing apparatus 200 determines the service monitored status for a particular computing system service based at least in part on indirect query to another computing device that stores and/or is configured to determine the service monitored status of another computing device (e.g., serving as a central hub).

In some embodiments, the root cause processing apparatus 200 monitors or otherwise "checks" the service monitored status of one or more computing system service(s) at determinable timestamp interval(s). Alternatively or additionally, in some embodiments, the root cause processing apparatus 200 monitors the service monitored status of one or more computing system service(s) based on historical data associated with the one or more computing system service(s). For example, if historical data indicates that a computing system service has a historical pattern of becoming unavailable or otherwise experiencing an alert often (e.g., more than a threshold number of times over a historical time period, above a particular threshold percentage of time, and/or the like), such computing system service(s) may be monitored more often. Alternatively or additionally, if particular computing system service(s) are experiencing alert(s) more often than over historical time periods (e.g., historically alerts 100 times over 24 hours, and alerting 100 times over the last 15 minutes), the root cause processing apparatus 200 may detect, request, and/or otherwise monitor the service monitored status of such computing system service(s) more often than computing system service(s) operating similarly to historical times. In some such embodiments, the root cause processing apparatus 200 sets a threshold for monitoring particular computing system service(s), and/or sets a threshold indicating when particular computing system service(s) is/are affected by a data event based on such historical data.

In some embodiments, the system operations graph searching algorithm comprises a modified breadth first search algorithm. In some such embodiments, the modified breadth first search algorithm is performed beginning from the node corresponding to the computing system service associated with a received alert corresponding to a data event. The root cause processing apparatus 200 in some embodiments iteratively checks the service monitored status associated with each computing system service identified by nodes in the directed dependency graph as depending on the affected computing system service. In this regard, if the root cause processing apparatus 200 determines during an iteration of the breadth first search that a computing system service depending on an affected computing system service is also affected by the data event (e.g., includes data logs indicating experiencing of the data event, not operating normally, receiving error(s), unavailable, not operating within normal operating parameters, and/or the like), the root cause processing apparatus 200 marks the second node corresponding to this computing system service with an affected status and recursively continues a new iteration of the breadth first search from this second node upon completion of the current iteration. Additionally or alternatively, in some embodiments, upon completion of a breadth first search of nodes corresponding to computing system services that rely on a particular affected computing system service (e.g., parent nodes for a particular child node marked with an affected status), the modified breadth first search algorithm proceeds with checking child nodes for the affected computing system service (e.g., nodes on which the affected computing system service is dependent). In a circumstance where the root cause processing apparatus 200 determines during the breadth first search that a computing system service is not affected by the data event, the root cause processing apparatus 200 marks the second node corresponding to this computing system service with an unaffected status and continues the current iteration of the breadth first search (e.g., without initiating a next iteration from the node marked as unaffected). It will be appreciated that in this manner, the root cause processing apparatus 200 utilizes the modified breadth first search algorithm to mark each node corresponding to an affected computing system service, where the marked nodes define an affected services subgraph radiating out from the node associated with the computing system service for which an alert was received. It will be appreciated that, in some embodiments, computing system services closer to a particular computing system service that received an alert are processed first weighted with a higher probability as more likely to be a root cause computing system service.

In some embodiments, the modified breadth first search algorithm (or other system operations graph searching algorithm) continues to monitor the service monitored status associated with one or more computing system services at the final layer of computing system services (e.g., those determined to be unaffected). In this regard, in some embodiments the root cause processing apparatus 200 checks (at one time, at predetermined timestamp intervals, or continuously) the status such computing system services to determine whether the computing system services remain unaffected. In a circumstance where a previously unaffected computing system service is determined affected in a subsequent check, the root cause processing apparatus 200 may utilize such subsequent checks to identify the updated service monitored status and detect latent effects of a data event. For example, in one example context, a service error alerted at a first computing system service may cause a latent error for an upstream computing system service that is not detected during the initial system operations graph searching algorithm, and the upstream computing system service is marked as "unaffected." However, this latent error is detectable by subsequent monitoring of the upstream computing system service, thus enabling the affected services subgraph to be updated to include the upstream computing system service and the root cause processing apparatus 200 to perform subsequent processing of the updated affected services subgraph.

In some embodiments the root cause processing apparatus 200 begins a modified breadth first search algorithm beginning from the node 402 corresponding to the computing system service 302. In this regard, the first breadth first search iteration of the modified breadth first search algorithm checks the service monitored status of the computing system service represented by each node having an incoming edge to node 402 (e.g., each node corresponding to a computing system service dependent on the computing system service 302, as noted by a parent node with an edge terminating at the node 402). As depicted, such nodes include nodes 404 and 406. In some such embodiments, the root cause processing apparatus 200 checks the service monitored status associated with the computing system service 304 to determine that the computing system service 304 is also associated with an affected status, and marks the corresponding node 404 as associated with an affected status. Additionally, the root cause processing apparatus 200 queues a subsequent iteration of breadth first search beginning from the node 404 (e.g., upon completion of the current iteration). The root cause processing apparatus 200 subsequently checks the service monitored status associated with the computing system service 306 corresponding to the node

406, and similarly determines that the computing system service 306 is also associated with an affected status. The root cause processing apparatus 200 marks the node 406 as associated with an affected status and similarly recursively queues a subsequent breadth first search iteration beginning from the computing system service 306 corresponding to the node 406.

The current iteration completes upon marking node 406. The modified breadth first search algorithm thus begins a new iteration beginning from node 404. Node 406 is indicated as a dependency for node 408, thus the root cause processing apparatus 200 checks the service monitored status associated with computing system service 308 corresponding to node 408 and similarly determines that the computing system service 308 is affected by the data event. Accordingly, the root cause processing apparatus 200 marks the node 408 accordingly and queues a recursive subsequent breadth first search iteration beginning from node 408. The current iteration subsequent ends.

The root cause processing apparatus 200 subsequently recursively initiates the next breadth first search iteration beginning from the node 406. The node 406 is a dependency for node 408, which was already checked in the previous iteration. Accordingly, the current iteration again ends.

The root cause processing apparatus 200 subsequently recursively initiates the next breadth first search iteration beginning from the node 408. During this iteration, the root cause processing apparatus 200 identifies node 414 as depending on node 408, and subsequently initiates a check of the service monitored status of computing system service 314 corresponding thereto. In one example context, the root cause processing apparatus 200 determines the computing system service 314 is not affected by the data event (e.g., the computing system service 314 is operating normally), and thus marks the corresponding node 414 with an unaffected status. In some such embodiments, since the root cause processing apparatus 200 determines the computing system service 314 is unaffected, the root cause processing apparatus 200 does not recursively queue any subsequent breadth first search iteration. The current iteration thus terminates, and with no recursive iterations for nodes directly or independently dependent on node 402 remaining, processing returns to node 402.

In some embodiments, upon completion of processing each node dependent on node 402, the modified breadth first search algorithm processes each node on which the node 402 depends. For example, as illustrated, the node 402 depends on nodes 410 and 416. Accordingly, in some embodiments, the root cause processing apparatus 200 proceeds by checking the service monitored status associated with the computing system service 310 corresponding to the node 410, and determines that the computing system service 310 is affected by the data event. Accordingly, the root cause processing apparatus 200 marks the node 410 with an affected status and queues a subsequent iteration recursively beginning from node 410. The root cause processing apparatus 200 subsequently continues the current iteration by requesting the service monitored status associated with the computing system service 316 associated with node 416. As depicted, the root cause processing apparatus 200 determines that the computing system service 316 is not affected by the data event, and thus marks the node 416 as associated with an unaffected status and does not queue any subsequent iteration.

The root cause processing apparatus 200 subsequent continues to process node 410. As depicted, both nodes 416 and node 412 are dependent on node 410. However, node 416 has already been processed, and thus need not be processed again during the current iteration. Accordingly, in some embodiments the root cause processing apparatus 200 checks the service monitored status of the computing system service 312 and determines that the computing system service 312 is similarly not affected by the data event (e.g., operating normally). In some such embodiments, the root cause processing apparatus 200 marks node 412 as associated with an unaffected status, and the modified breadth first search algorithm ends. It will be appreciated that the algorithm never reaches node 418 corresponding to computing system service 318, since node 418 depends only on computing system services associated with nodes marked as unaffected.

In some embodiments the root cause processing apparatus 200 begins a modified depth first search algorithm beginning from the node 402 corresponding to the computing system service 302. In this regard, the first depth first search iteration of the modified depth first search algorithm checks the service monitored status of the computing system service represented by each node having an incoming edge to node 402 (e.g., each node corresponding a computing system service that depends on the computing system service 302, as noted by a parent node with an edge terminating at the node 402). As depicted, such nodes include nodes 404 and 406. In some such embodiments, the root cause processing apparatus 200 checks the service monitored status associated with computing system service 304 to determine that the computing system service 304 is associated with an affected status, and marks the corresponding node 404 as associated with an affected status. Additionally, based on the implementation of depth first searching, the root cause processing apparatus 200 initiates a subsequent iteration of depth first search beginning from the node 404. During the subsequent iteration, the root cause processing apparatus 200 checks the service monitored status of the computing system service 308 corresponding to node 408, and identifies the computing system service 308 as affected by the data event. Accordingly, the root cause processing apparatus 200 again marks the node 408 as associated with an affected status and initiates a subsequent iteration of depth first search beginning from the node 408.

When processing node 408, the root cause processing apparatus 200 determines the computing system service 314 is not affected by the data event. In some such embodiments, the root cause processing apparatus 200 marks the corresponding node 414 as associated with an unaffected status. Subsequently, the root cause processing apparatus 200 ends the current iteration of depth first search and returns recursively to process other paths from the nodes previously checked. In this regard, it will be appreciated that the modified depth first search algorithm continues in this manner until all paths terminating at a computing system service with an unaffected status have been explored. In this regard, all computing system services of the computing environment 300 are checked with the exception of computing system service 318 corresponding to node 418, as it depends only on computing system services determined not affected by the data event and therefore is never reached.

It will be appreciated that embodiments utilizing a modified breadth first search algorithm and embodiments utilizing a modified depth first search algorithm identify the same plurality of affected computing system services embodying an affected computing system service set. However, the order in which such affected computing system services are identified differs. In some contexts, utilizing a modified breadth first search algorithm is advantageous over a modified depth first search algorithm due to the nature of dependencies between computing system services therein. In other contexts, a modified depth first search algorithm is advantageous, for example where multiple, long chains of indirect dependencies are likely.

In some embodiments, a value is determined based on the closeness of each computing system service to a computing system service for which an alert was detected. For example, in some embodiments, the root cause processing apparatus 200 assigns a weight to each directed edge and/or node based on the level of the node offset from the node corresponding to the alerting computing system service. In one example context, the weight value is determined by the formula weight=level^X*centrality, wherein the level represents the offset from the alerting computing system service, X represents a determinable weight assigned to each level, and centrality represents a value determined by the centrality algorithm.

Upon completion of determining the plurality of affected computing system services embodying an affected computing system service set and/or marking the node(s) associated therewith, in some embodiments the root cause processing apparatus 200 utilizes the marked directed dependency graph to process a particular portion thereof. It will be appreciated that in some embodiments, the root cause processing apparatus 200 generates and/or maintains a different directed dependency graph associated with nodes marked associated with each different data event for which an alert is received. In this regard, the root cause processing apparatus 200 in some embodiments stores data sufficient to reproduce the directed dependency graph 400 with appropriate markings of service monitored statuses to enable storage and/or reproduction of the directed dependency graph with indicators of what computing system service(s) were affected for a particular data event.

Figure 7:
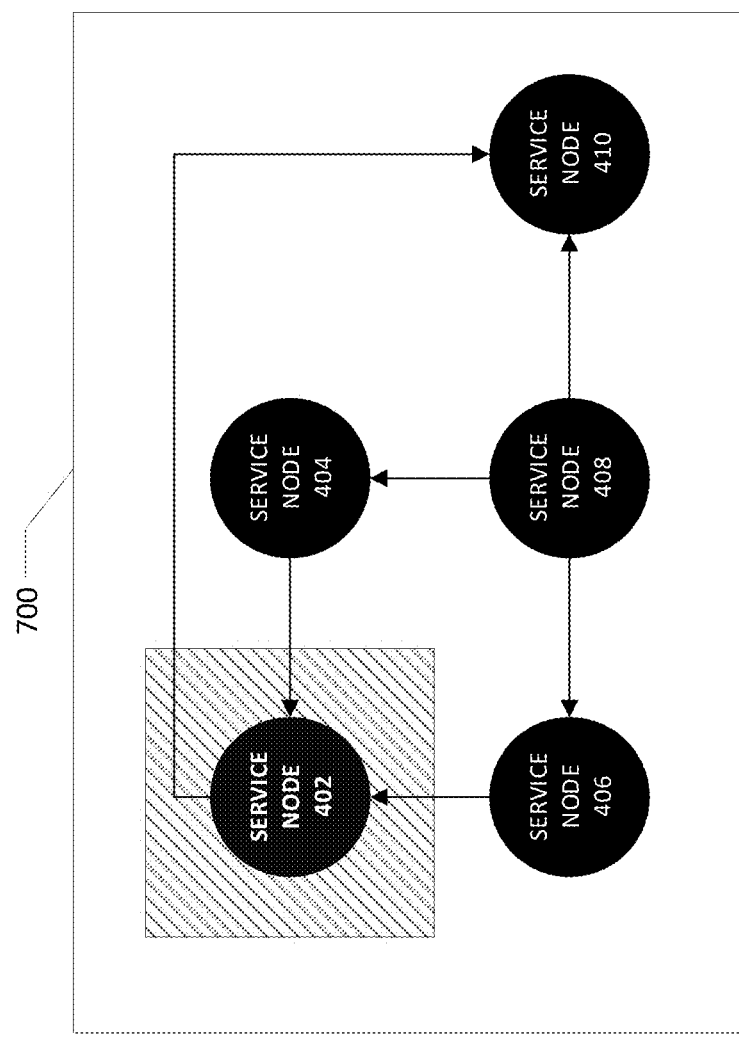
FIG. 7 illustrates an example visualization of an affected services subgraph of a directed dependency graph in accordance with at least some embodiments of the present disclosure.

In some embodiments, upon completion of one or more process(es) for marking affected computing system service(s) (e.g., a system operations graph searching algorithm) of a computing environment, the root cause processing apparatus 200 extracts an affected services subgraph from the directed dependency graph marked with sufficient service monitored status(es) for each node. FIG. 7 illustrates an example visualization of an affected services subgraph of a directed dependency graph in accordance with at least some embodiments of the present disclosure. Specifically, FIG. 7 depicts an example affected services subgraph 700 corresponding to a plurality of affected computing system services embodying the affected computing system service set determined as described with respect to FIG. 6. In some such embodiments, the root cause processing apparatus 200 generates and/or extracts the affected services subgraph 700 embodying the set of nodes marked as associated with an affected status via a system operations graph searching algorithm. For example, in some embodiments the affected services subgraph 700 includes only the nodes marked as associated with an affected status, as well as the directed edge set including any directed edge between such nodes. Alternatively or additionally, in some embodiments, the root cause processing apparatus 200 generates the affected services subgraph by removing from the directed dependency graph each node marked as unaffected and/or unchecked via a system operations graph searching algorithm, and any edge(s) associated with such nodes. In some such embodiments, the affected services subgraph 700 does not include or ignores each node marked as associated with an unaffected status or otherwise not checked during a system operations graph searching algorithm.

The affected services subgraph 700 depicts the nodes affected by the data event and is processable to determine the nodes representing computing system services most likely to be the root cause computing system service for a particular data event. It will be appreciated that the generation of the affected services subgraph advantageously greatly reduces the computing system services requiring consideration as a possible root cause computing system service. Additionally, the nature of the affected services subgraph and dependencies depicted therein advantageously enables further processing to be performed on the limited set of nodes to more accurately identify a root cause computing system service. For example, in some embodiments, the root cause processing apparatus 200 applies a centrality algorithm to the affected services subgraph 700 to determine a root cause computing system service based at least in part on the dependencies indicated by the nodes and directed edges of the affected services subgraph 700. For example, in some embodiments, the root cause processing apparatus 200 applies a modified VoteRank, Betweenness, PageRank, and/or other algorithm that identifies a single root cause computing system service and/or a prioritized root cause computing system service list comprising an ordered arrangement of most-likely root cause computing system services.

Figure 8:
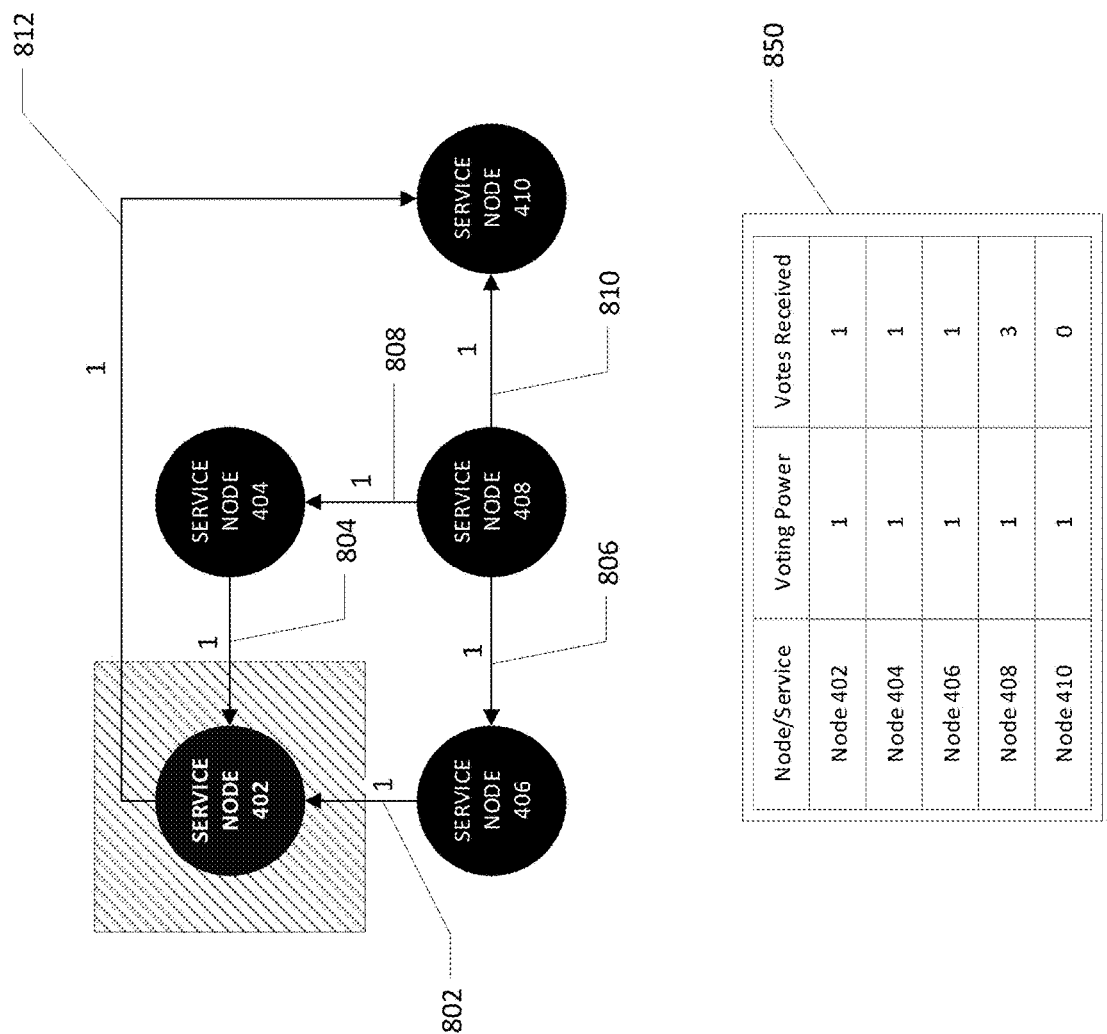
FIG. 8 illustrates an example visualization for processing of an affected services subgraph using a centrality algorithm in accordance with at least some embodiments of the present disclosure.

FIG. 8 illustrates an example visualization for processing of an affected services subgraph using a centrality algorithm in accordance with at least some embodiments of the present disclosure. Specifically, FIG. 8 illustrates directed edge weightings for processing the affected services subgraph 700 based at least in part on a centrality algorithm embodying a modified VoteRank algorithm. It will be appreciated that the example implementation and use of a centrality algorithm depicted and described with respect to FIG. 8 is merely exemplary, and in other embodiments other types of centrality algorithm(s) and/or specific implementation details may differ. Accordingly, the particular implementation depicted and described with respect to FIG. 8 should not limit the scope and spirit of this disclosure.

As illustrated in FIG. 8, each directed edge is associated with a particular weight utilized by the corresponding centrality algorithm. For example, each of the directed edges 802-812 is associated with a weight of 1. In some embodiments, the root cause processing apparatus 200 assigns a weight to each directed edge that is based on a voting power value assigned to the node where such a directed edge terminates. For example, the weight for directed edges 804 and 802 in some embodiments is set based at least in part on a voting power assigned to node 402 (e.g., where each of the directed edges 802 and 804 terminate). Similarly, the weight assigned to edge 808 is set based at least in part on a voting power assigned to node 404, and the weight for edge 806 is assigned based at least in part on a voting power assigned to node 406. Finally, the weight assigned for edge 810 and edge 812 is assigned based at least in part on a voting power assigned to node 410.

In some embodiments, the root cause processing apparatus 200 maintains a centrality algorithm, for example a modified VoteRank algorithm, that utilizes the nodes and weights of each of the directed edges 802-812 to determine a root cause computing system service. In some embodiments, the root cause processing apparatus 200 in some embodiments generates and/or receives a root cause vote (a "vote") from each node for each incoming edge associated with that node. In this regard, each particular node is associated with a vote for each computing system service represented by a parent node of a directed edge terminating at the particular node. As depicted in FIG. 8, for example, the root cause processing apparatus 200 receives and/or generates a vote for node 404 (corresponding to directed edge 804) and a vote for node 406 (corresponding to directed edge 802) from node 402. Further, the root cause processing apparatus 200 generates and/or receives only a vote for node 408 (corresponding to directed edge 808) from node 404. In this regard, each child node is capable of voting only for a parent node, representing a parent service that is dependent on the child service represented by the child node. As depicted, each vote is attributed a value corresponding to the weight assigned to the directed edge on which the vote is based. The root cause processing apparatus 200 continues to track votes for each node until all votes have been received for node in the affected services subgraph. The total votes for each node in the affected services subgraph, as depicted in the root cause vote set 850. As illustrated, the root cause vote set 850 indicates that nodes 402, 404, and 406 each received 1 total vote, while node 410 received 0 total votes and node 408 received 3 total votes.

In some embodiments, the centrality algorithm continues by selecting a root cause computing system service based on the total votes for each node. For example, in some embodiments the apparatus root cause processing apparatus 200 utilizes a centrality algorithm selects a root cause computing system service corresponding to the node that received the highest vote count. In this regard, as depicted, the root cause processing apparatus 200 utilizes the centrality algorithm to identify and/or select the node 408 as the root cause computing system service—which corresponds to the highest vote total of 3.

Figure 9:
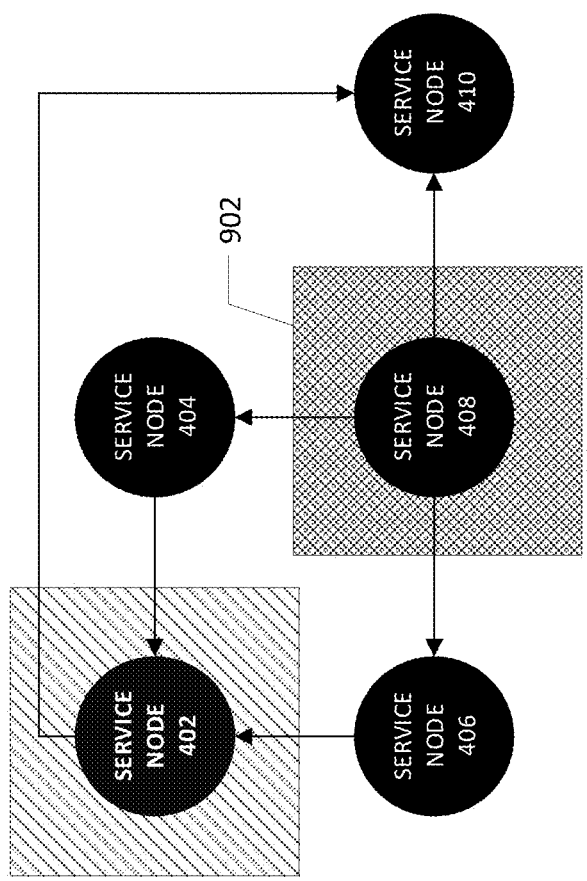
FIG. 9 illustrates an example visualization of an identification of a root cause computing system service in an affected services subgraph in accordance with at least some embodiments of the present disclosure.

In some embodiments, the root cause processing apparatus 200 marks and/or otherwise stores data indicating the root cause computing system service identified via the centrality algorithm. FIG. 9 illustrates an example visualization of an identification of a root cause computing system service in an affected services subgraph in accordance with at least some embodiments of the present disclosure. Specifically, in FIG. 9, the root cause computing system service is indicated by root cause indicator 902, depicted as a patterned box. It will be appreciated that in some embodiments the root cause processing apparatus 200 marks the node 408 with one or more data flag(s), value(s), and/or the like indicating the node identified as corresponding to the root cause computing system service.

In some embodiments, the root cause processing apparatus 200 utilizes a centrality algorithm that performs multiple iterations, with each iteration identifying a root cause computing system service representing the next-most-likely root cause computing system service not selected from previous iterations. In some such embodiments, the root cause processing apparatus 200 generates a prioritized root cause computing system service list based on the root cause computing system service identified in each iteration. In this regard, the prioritized root cause computing system service list represents an ordered arrangement of at least a portion of the nodes in the affected services subgraph, with the order indicating the likelihood that each computing system service is a root cause computing system service as compared to the other computing system services as determined by the root cause processing apparatus 200.

Figure 10:
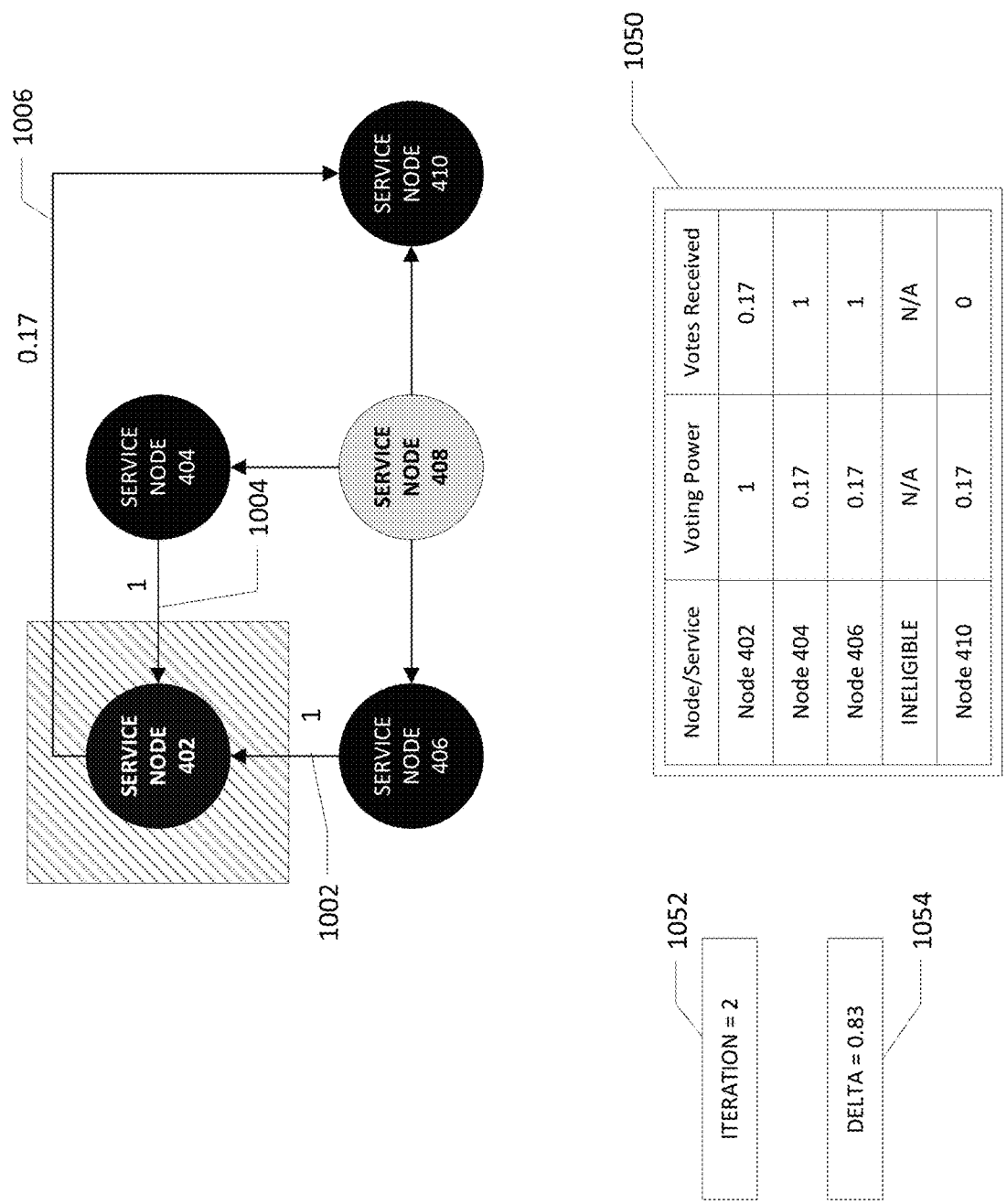
FIG. 10 illustrates an example visualization of determining a next-most-likely root cause computing system service from an affected services subgraph using a multi-iteration centrality algorithm in accordance with at least some embodiments of the present disclosure.

FIG. 10 illustrates an example visualization of determining a next-most-likely root cause computing system service from an affected services subgraph using a multi-iteration centrality algorithm in accordance with at least some embodiments of the present disclosure. Specifically, FIG. 10 depicts a current iteration value 1052 indicating a second iteration of a modified centrality algorithm that continues from the first iteration depicted and described with respect to FIGS. 7-9. It will be appreciated that in some embodiments, a centrality algorithm performs any number of iterations to determine each next-most-likely root cause computing system service from an affected services subgraph. In some embodiments, the centrality algorithm performs continuously until each the computing system services in the affected services subgraph has been selected and ordered. In some such embodiments, the root cause processing apparatus 200 generates a prioritized root cause computing system service list arranged in an order as each next-most-likely root cause computing system service is selected.

As depicted in FIG. 10, the nodes of the affected services subgraph is/are altered to mark the nodes corresponding to computing system services selected in previous iterations. In some embodiments, each node associated with a computing system service previously selected is marked with a data flag to indicate the computing system service was selected during a previous iteration. For example, as depicted, node 408 is marked as previously selected as a root cause computing system service. In some such embodiments, the nodes previously selected cannot be selected during subsequent iteration(s) of the centrality algorithm. In this regard, the node 408 and/or the directed edges associated therewith in some embodiments are marked as inaccessible and/or removed from the affected services subgraph before performing subsequent iterations.

In some embodiments, the voting power of one or more nodes is adjusted before initiating a subsequent iteration. For example, in some embodiments the root cause processing apparatus 200 decreases the voting power of each node neighboring a selected node from a previous iteration. In some such embodiments, the voting power of a node is reduced based at least in part on a delta maintained by the root cause processing apparatus 200. For example, in some embodiments the root cause processing apparatus 200 reduces each the voting power of each node by i*delta, where i represents the zero-bounded number of the current iteration. As depicted, the voting power of nodes 404, 406, and 410 each are reduced as neighboring the previously selected node 408. In this regard, each incoming directed edge terminating at the node 410 is weighted according to the new voting power. For example, as depicted the centrality algorithm utilizes a delta of 0.83 as indicated by element 1054, thus the voting power associated with node 410 is reduced by 0.83 and the directed edge 1006 is assigned a weight of 0.17. The other nodes 404 and 406 have their voting power reduced, however they have no incoming directed edges remaining to be set based on the updated voting power. The node 402 remains with an unadjusted voting power as it is not a neighboring node to the previously selected node 408. Accordingly, directed edges 1002 and 1004 terminating at node 402 are each set to an unreduced weight of 1. In some embodiments, the delta value is determined based at least in part on the graph structure of the affected services subgraph. For example, in some embodiments, the root cause processing apparatus 200 sets the delta value as an inverse of the average degree for the affected services subgraph.

The root cause processing apparatus 200 determines an updated root cause vote set 1050 for the second iteration based on the updated weights. As depicted, node 408 remains ineligible for voting, therefore only the directed edges associated with the remaining nodes are processed to generate the total vote count for each of the remaining nodes. As illustrated, the updated root cause vote set 1050 indicates nodes 404 and 406 each receive 1 total vote, while node 402 receives 0.17 total votes, and node 410 receives 0 total votes (e.g., as it has no outgoing directed edges). Accordingly, nodes 404 and 406 are identified as corresponding to the next-most-likely root cause computing system services, namely computing system services 304 and 306. In some embodiments, the root cause processing apparatus 200 includes data in a prioritized root cause computing system service list that represents the computing system services 304 and 306 as the next-most-likely root cause computing system services and/or data that indicates the nodes 404 and 406 corresponding thereto.

It will be appreciated that, in some embodiments, the root cause processing apparatus 200 continues for any number of iterations until one or more threshold condition(s) is/are met. For example, in some embodiments the root cause processing apparatus 200 continues until a threshold number of computing system services are included in the prioritized root cause computing system service list. Alternatively or additionally, in some embodiments, the root cause processing apparatus 200 continues until a threshold number of iterations are performed. Alternatively or additionally, in some embodiments, the root cause processing apparatus 200 continues until all nodes in the affected services subgraph have been selected and/or are represented in a prioritized root cause computing system service list.

Figure 11:
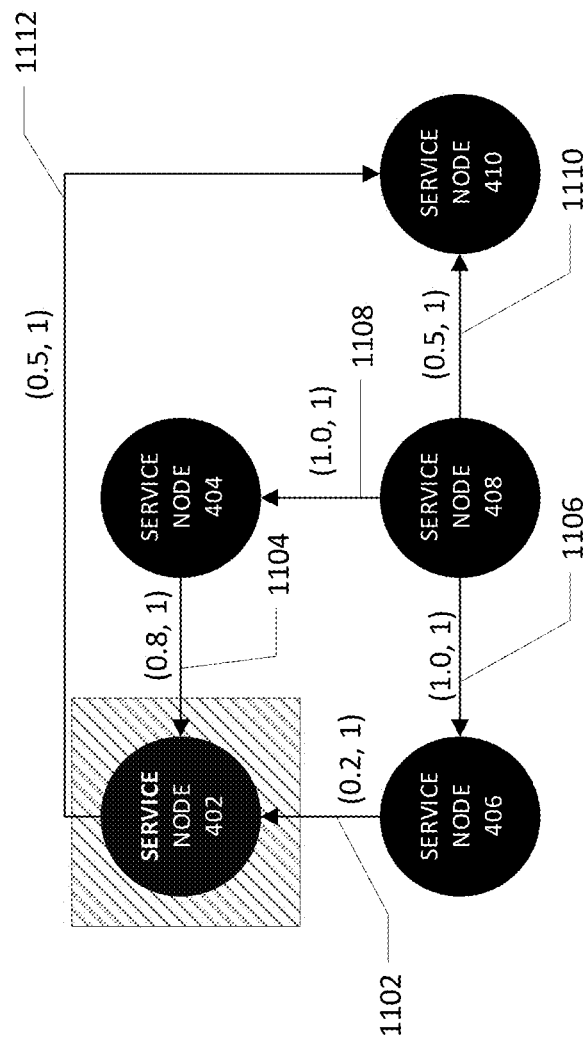
FIG. 11 illustrates an example visualization of graph edge weighting for use in processing an affected services subgraph using a centrality algorithm in accordance with at least some embodiments of the present disclosure.

In the example embodiments described above, each node applies its full voting power to each directed edge terminating at that node (e.g., each incoming directed edge). In some embodiments, the centrality algorithm applies different weights to different edges, for example based on a probabilistic distribution governing each edge of a particular node. For example, FIG. 11 illustrates an example visualization of graph edge weighting for use in processing an affected services subgraph using a centrality algorithm in accordance with at least some embodiments of the present disclosure. Specifically, FIG. 11 depicts an affected services subgraph associated with a directed edge set assigned weights based on both a voting power and probability assigned for each node and directed edge.

As illustrated, each edge is associated with a tuple (x, y), with x comprising an edge probability for selecting the particular directed edge and y indicated the voting power for the current iteration of the associated node. In some such embodiments, the edge probabilities for all incoming edges of a particular node totals 1.0 (or alternatively, 100%). In this regard, node 402 is associated with incoming directed edge 1104 assigned an edge probability of 0.8 and incoming directed edge 1102 assigned an edge probability of 0.2, thus totaling 1.0. It will be appreciated that in some embodiments, the root cause processing apparatus 200 automatically and/or algorithmically determines the edge probability for one or more directed edge(s). For example, in some embodiments the root cause processing apparatus 200 determines the edge probability for a particular directed edge based at least in part on any number of data-driven process(es) that manipulate operations data associated with the computing system service represented by the node, dependencies associated with the computing system service and/or parent or child computing system service(s), historical data indicating root cause computing system service(s) for one or more previously received data event(s), and/or the like. In other embodiments, the root cause processing apparatus 200 sets the edge probability for one or more directed edge(s) based at least in part on user input indicating the edge probability to be set for a particular directed edge.

In some such embodiments, the root cause processing apparatus 200 utilizes a centrality algorithm that utilizes the edge probability of each directed edge together with the voting power associated therewith to generate a vote for a particular node. For example, in some embodiments, the voting power assigned to a directed edge is multiplied by the edge probability associated with that edge to determine the value of the vote generated by that edge, which is then added associated with the node from which the directed edge originates. For example, for the incoming directed edges 1102 and 1104 associated with node 402, votes are generated from node 402 with a value of 0.8 for node 404 (e.g., determined by edge probability times weight of 0.8*1.0), and with a value of 0.2 for node 406 (e.g., determined by edge probability times weight of 0.2*1.0). For the remaining directed edges as depicted, directed edge 1106 represents a vote with a value of 1.0, directed edge 1108 represents a vote with a value of 1.0, directed edge 1110 represents a vote with a value of 0.5, and directed edge 1112 represents a vote with a value of 0.5.

Modified centrality algorithm(s) that leverage edge probability provide additional advantages derived from the edge probability. For example, using the edge probability, learned relationships indicating particular nodes more likely to represent a root cause computing system service can be represented, such as based at least in part on processing historical data associated with previously received data event(s). In this regard, such embodiments perform with increased accuracy in circumstances where such learned relationships are leveraged by setting an edge probability.

In some embodiments, one or more of the graph(s) depicted and/or described herein, and/or the subgraph(s) thereof, is/are rendered to a computing device associated with at least one end user. For example, in some embodiments, the root cause processing apparatus 200 causes rendering of a user interface graphically depicting any of the graph(s) and/or sub-graph(s) depicted and/or described with respect to FIGS. 4-11. Additionally or alternatively, in some embodiments, the root cause processing apparatus 200 causes rendering of such graph(s) and/or subgraph(s) with one or more visually distinguished node(s), for example corresponding to the node for which an alert was received, and/or one or more node(s) identified as a root cause computing system service via a centrality algorithm. In this regard, such visual depiction(s) enable an end-user to readily identify the particular computing system service that received an alert associated with a data event, the particular computing system service(s) identified as most probable to be the root cause of the data event, and/or the like.

Example Processes of the Disclosure

Having described example systems and apparatuses, printed code implementations, and data objects and data processing visualizations in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 12:
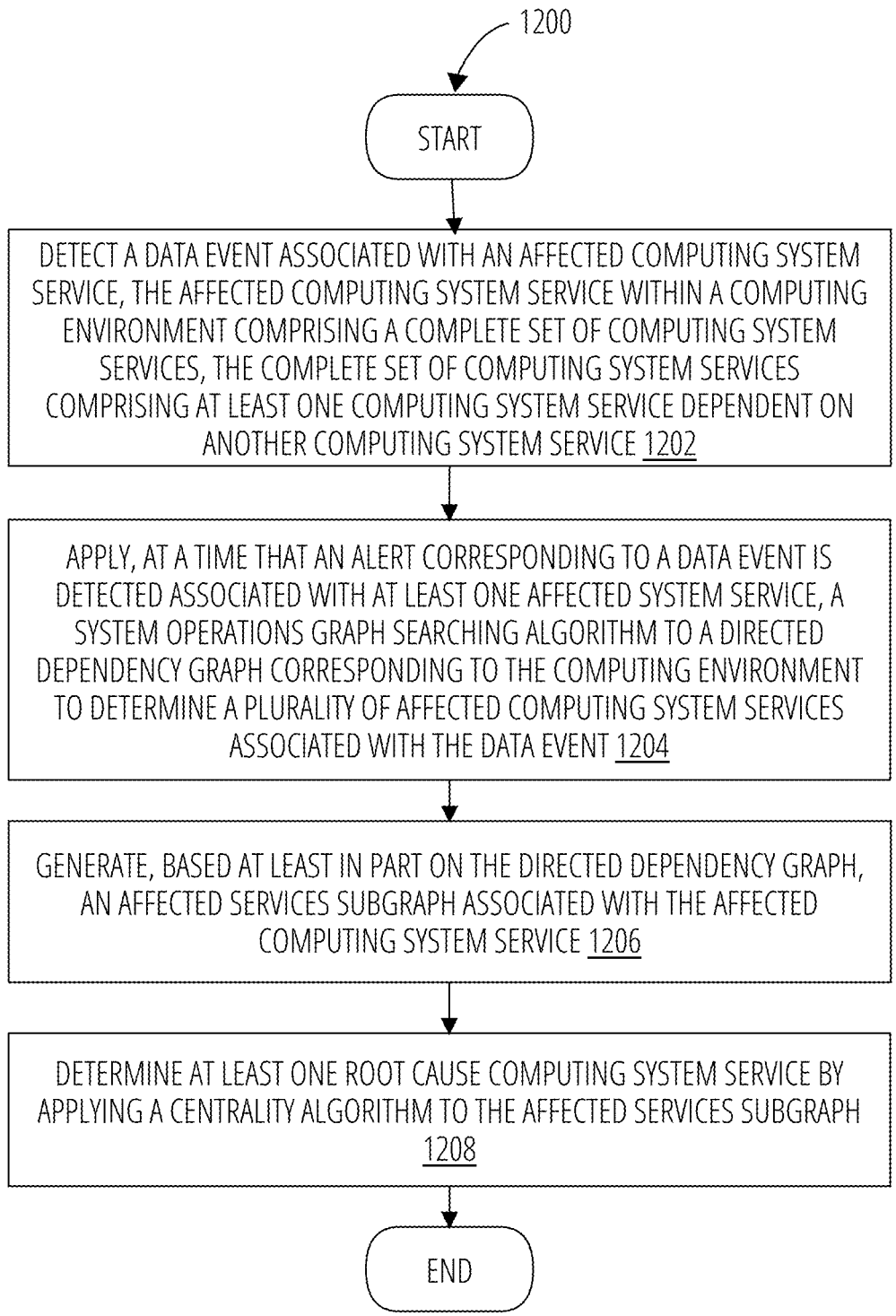
FIG. 12 illustrates a process 1200 for determining at least a root cause computing system service in accordance with at least some embodiments of the present disclosure.

FIG. 12 illustrates a process 1200 for determining at least a root cause computing system service in accordance with at least some embodiments of the present disclosure. Specifically, FIG. 12 depicts operations of an example process 1200. In some embodiments, the process 1200 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the root cause processing apparatus 200 alone or in communication with one or more other component(s), device(s), system(s), and/or the like. In this regard, in some such embodiments, the root cause processing apparatus 200 is specially configured by computer-coded instructions (e.g., computer program instructions) stored thereon, for example in the memory 204 and/or another component depicted and/or described herein and/or otherwise accessible to the root cause processing apparatus 200, for performing the operations as depicted and described. In some embodiments, the root cause processing apparatus 200 is in communication with one or more external apparatus(es), system(s), device(s), and/or the like, to perform one or more of the operations as depicted and described. For example, the root cause processing apparatus 200 in some embodiments is in communication with an end-user computing device(s), client device(s), and/or the like. For purposes of simplifying the description, the process 1200 is described as performed by and from the perspective of the root cause processing apparatus 200.

The process 1200 begins at operation 1202. At operation 1202, the root cause processing apparatus 200 includes means such as the notification management circuitry 214, root cause identification circuitry 212, data event detection circuitry 210, communications circuitry 208, input/output circuitry 206, and/or processor 202, or a combination thereof, to detect a data event associated with an affected computing system service. The affected computing system service is within a computing environment comprising a complete set of computing system services. The complete set of computing system services in some embodiments includes all computing system services that are interconnected within the root cause processing apparatus 200. Specifically, within the complete set of computing system services, the complete set of computing system services comprises at least one computing system service dependent on another computing system service in the complete set of computing system services. It will be appreciated, as described herein, that the complete set of computing system services includes any number of computing system service dependencies between the various computing system services therein.

The root cause processing apparatus 200 may detect the data event in any of a myriad of manners. For example, in some embodiments, the root cause processing apparatus 200 receives an alert indicating the data event is affecting at least one particular computing system service of the computing environment. In some such embodiments, the alert is received as a transmission from the affected computing system service itself. Alternatively or additionally, in some embodiments, the alert is received in response to the root cause processing apparatus 200 monitoring operations data associated with at least the affected computing system service, and determining that the affected computing system service is not operating normally (e.g., is operating outside of a normal operating zone, is not available, and/or the like).

At operation 1204, the root cause processing apparatus 200 includes means such as the notification management circuitry 214, root cause identification circuitry 212, data event detection circuitry 210, communications circuitry 208, input/output circuitry 206, and/or processor 202, or a combination thereof, to apply, at a time that a data event is detected (e.g., via a received alert) associated with at least one affected system service, a system operations graph searching algorithm to a directed dependency graph corresponding to the computing environment to determine a plurality of affected computing system services associated with the data event. In some embodiments, the plurality of affected computing system services embodies an affected computing system service set. In some such embodiments, the affected computing system service set includes data indicating each computing system service of the complete set of computing system services that is/are similarly determined to not be operating normally or otherwise determined to be affected by the data event.

In some embodiments, the root cause processing apparatus 200 generates and/or maintains the directed dependency graph representing the computing environment. In some such embodiments, the directed dependency graph comprises at least a first node set comprising a node representing each computing system service of the complete set of computing system services. Additionally or alternatively, in some embodiments, the root cause processing apparatus 200 comprises a first directed edge set comprising, for each particular node in the first node set, a directed edge from the node to a dependency node associated with another computing system service on which the particular computing system service of the particular node depends. In this regard, each directed edge connects a "parent node" from which the directed edge originates with a "child node" at which the directed edge terminates, indicating that the computing system service represented by the parent node is dependent on the computing system service for the child node. In some embodiments, the root cause processing apparatus 200 determines the dependency relationships between computing system services of the complete set of computing system services by querying the individual computing system service(s), retrieving data representing the dependency relationships from a data repository or other knowledge base, and/or the like.

At operation 1206, the root cause processing apparatus 200 includes means such as the notification management circuitry 214, root cause identification circuitry 212, data event detection circuitry 210, communications circuitry 208, input/output circuitry 206, and/or processor 202, or a combination thereof, to generate, based at least in part on the directed dependency graph, an affected services subgraph associated with the affected computing system service. In some embodiments, the affected services subgraph indicates the one or more other affected computing system services represented in the affected computing system service set that are similarly affected by the data event. In some embodiments, the root cause processing apparatus 200 marks each node within the directed dependency graph, or a data copy thereof, that corresponds to a computing system service of the affected computing system service set.

At operation 1208, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine at least one root cause computing system service associated with the data event. In some embodiments, the root cause processing apparatus 200 determines the at least one root cause computing system service by applying a centrality algorithm to the affected services subgraph. In some embodiments, the root cause processing apparatus 200 includes the root cause computing system service in a prioritized root cause computing system service list that includes one or more additional next-most-likely root cause computing system service, for example based at least in part on one or more additional iteration(s) performed by the centrality algorithm. It will be appreciated that any of a myriad of modified centrality algorithm(s) may be utilized, for example modified VoteRank, PageRank, Betweenness, and/or the like. In some embodiments, the root cause processing apparatus 200 identifies a single root cause computing system service, for example embodying the computing system service identified as most likely to be the actual root cause of the data event.

In some embodiments, the at least one root cause computing system service is determined as a combination affected computing system services. For example, in some embodiments, the root cause processing apparatus 200 determines using the centrality algorithm that a plurality of affected computing system services are associated with the same likelihood of being the actual root cause of the data event. Alternatively or additionally, in some embodiments, the root cause processing apparatus 200 determines based at least in part on a rule set, historical data, knowledge base, and/or the like, that a particular data event is caused by a plurality of computing system services, such that multiple affected computing system service are determined as root cause computing system service at once.

In some embodiments, the root cause processing apparatus 200 uses the root cause computing system service in any of a myriad of manners. For example, in some embodiments, the root cause processing apparatus 200 generates and/or transmits one or more notifications based at least in part on the root cause computing system service. Alternatively or additionally, in some embodiments, the root cause processing apparatus 200 initiate(s) one or more process(es) associated with resolving connection(s) with the root cause computing system service and other computing system services. Alternatively or additionally still, in some embodiments, the root cause processing apparatus 200 initiates one or more process(es) associated with maintaining the root cause computing system service. These process(es) include any health check(s) for one or more computing system services, accepting alerts from external computing system(s) and/or service(s), proactively sending degradation message(s) and/or alarm(s) associated with one or more computing system service(s), and/or to notify particular relevant user(s) of and/or associated with a data event all at once or at appropriate times based on likelihood of being a root cause of the data event. For example, in some embodiments, the relevant user corresponds to a particular maintainer of a computing system service, an event responder, or any other technician that analyzes, responds to, and/or otherwise interacts with a computing system service corresponding to a particular alert of a data event. In this regard, some embodiments of the present disclosure identify particular computing device(s) associated with such user(s) to ensure that notification(s) are transmitted exclusively to the computing device(s) for such user(s) to prompt such user(s) to initiate one or more action(s). Such embodiments advantageously reduce or eliminate notification of user(s) unnecessarily, for example the remaining user(s) of affected computing system services whose actions will not and/or cannot assist in addressing a particular data event (e.g., because the effects to the computing system service associated with such user(s) is downstream and not a root cause of the data event). Non-limiting examples of uses for the root cause computing system service are depicted and described herein, but are exemplary and not to limit the scope and spirit of the disclosure.

In some embodiments, the root cause processing apparatus 200 enables an escalation-based process for root cause identification. For example, in some embodiments, the root cause processing apparatus 200 enables client devices (e.g., user devices and/or other service maintainer devices) associated with identified root cause computing system service(s) to mark and/or otherwise indicate one or more other computing system services as a root cause computing system service. Alternatively or additionally, in some embodiments the root cause processing apparatus 200 enables such client devices to transmit and/or trigger transmission of notifications to other client device(s) associated with other computing system services of the computing environment. In one example context, a user associated with an identified root cause computing system service may escalate maintenance associated with a particular data event to another computing system service once the user determines that the computing system service for which they are responsible is not the root cause of the data event (e.g., during maintenance and/or diagnosing of a data event). In this example context, the user may subsequently trigger a notification to another computing system service determined by the user to be a root cause computing system service. Alternatively or additionally, in some embodiments, the user may mark their associated computing system service as not a root cause and/or otherwise trigger the root cause processing apparatus 200 to continue a process for notifying a next-most-likely root cause computing system service.

Alternatively or additionally still, in some embodiments, an identified root cause computing system service is utilized as a new central node from which the computing system services of the computing environment are processed. For example, in some embodiments the root cause processing apparatus 200 initiates the centrality algorithm starting from the identified root cause computing system service. Based on this subsequently performed centrality algorithm, in some embodiments the root cause processing apparatus 200 identifies one or more updated root cause computing system service(s), and initiates one or more processes based on the updated root cause computing system service(s). In some embodiments, this subsequently performed centrality algorithm considers all computing system services associated with the originally identified root cause computing system service, including computing system services previously identified as unaffected. In this regard, even in circumstances where computing system services are operating normally or otherwise unaffected by a particular data event, they may be under monitoring if they are adjacent or otherwise determined sufficiently proximate to an affected computing system service (e.g., as determined from a directed dependency graph based on a threshold level) and therefore still be included in the next-iteration of the root cause analysis if they are subsequently detected as being affected during monitoring. Thus, such seemingly unaffected computing system services may still be determined as a root cause computing system service upon subsequent iterations.

In some embodiments, the root cause processing apparatus 200 maintains a certainty threshold for outputting and/or otherwise utilizing a determination of root cause computing system service. For example, in some embodiments, the root cause processing apparatus 200 generates one or more notifications or other output only in circumstances where a probability determined associated with the root cause computing system service satisfies (e.g., by exceeding) the certainty threshold. Alternatively or additionally, in some embodiments where a prioritized root cause computing system service list is determined, the root cause processing apparatus 200 generates notification(s) and/or other output only for the computing system services identified as associated with a probability of being the actual root cause that is above the certainty threshold.

Figure 13:
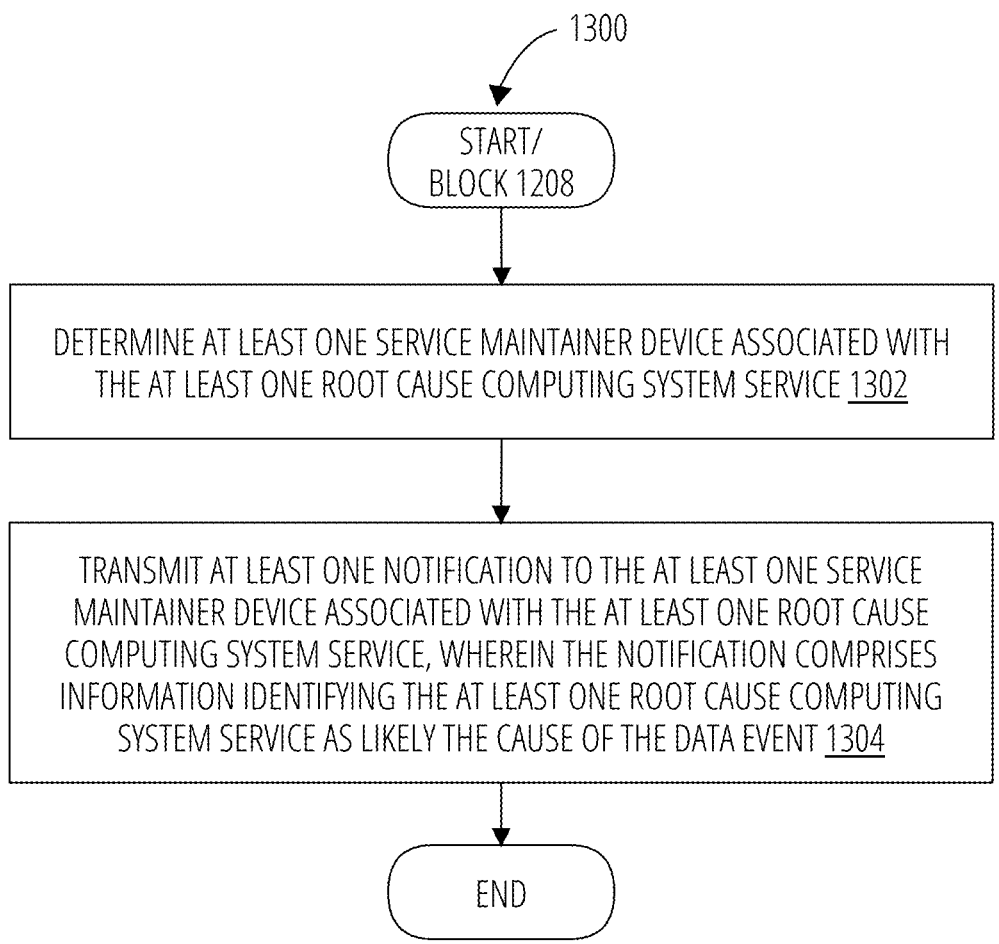
FIG. 13 illustrates a process 1300 for transmitting at least one notification identifying a root cause computing system service in accordance with at least some embodiments of the present disclosure.

FIG. 13 illustrates a process 1300 for transmitting at least one notification identifying a root cause computing system service in accordance with at least some embodiments of the present disclosure. Specifically, FIG. 13 depicts example operations of an example process 1300. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the root cause processing apparatus 200 alone or in communication with one or more other component(s), device(s), system(s), and/or the like. In this regard, in some such embodiments, the root cause processing apparatus 200 is specially configured by computer-coded instructions (e.g., computer program instructions) stored thereon, for example in the memory 204 and/or another component depicted and/or described herein and/or otherwise accessible to the root cause processing apparatus 200, for performing the operations as depicted and described. In some embodiments, the root cause processing apparatus 200 is in communication with one or more external apparatus(es), system(s), device(s), and/or the like, to perform one or more of the operations as depicted and described. In some embodiments, the root cause processing apparatus 200 is in communication with one or more external apparatus(es), system(s), device(s), and/or the like, to perform one or more of the operations as depicted and described. For example, the root cause processing apparatus 200 in some embodiments is in communication with an end-user computing device(s), client device(s), and/or the like. For purposes of simplifying the description, the process 1300 is described as performed by and from the perspective of the root cause processing apparatus 200.

The process 1300 begins at operation 1302. In some embodiments, the process 1300 begins after one or more operations depicted and/or described with respect to any one of the other processes described herein. For example, in some embodiments as depicted, the process 1300 begins after execution of operation 1208. In this regard, some or all of the process 1300 may replace or supplement one or more blocks depicted and/or described with respect to any of the processes described herein. Upon completion of the process 1300, the flow of operations may terminate. Additionally or alternatively, as depicted, upon completion of the process 1300 in some embodiments, flow may return to one or more operation(s) of another process. It will be appreciated that, in some embodiments, the process 1300 embodies a sub-process of one or more other process(es) depicted and/or described herein, for example the process 1200.

At operation 1302, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine at least one service maintainer device associated with the at least one root cause computing system service. In some embodiments, the root cause processing apparatus 200 maintains a data repository including data linking one or more service maintainer device(s) with each particular computing system service of a computing environment. In this regard, the service maintainer device in some embodiments corresponds to a particular administrator, engineer, or other end user responsible for implementing maintenance of a particular computing system service. It will be appreciated that several service maintainer devices in some embodiments are associated with a single computing system service, and/or that in some embodiments the root cause processing apparatus 200 determines a particular service maintainer device based on one or more data values (e.g., a current date, a current time, a severity determined associated with the data event, and/or the like).

In some embodiments, the root cause processing apparatus 200 determines particular information identifying and/or utilized to communicate with the service maintainer device over one or more communications network(s). For example, in some embodiments, the root cause processing apparatus 200 determines IP address information associated with the service maintainer device corresponding to the root cause computing system service. Alternatively or additionally, the root cause processing apparatus 200 in some embodiments determines a phone number, email address, or other third-party application device usable to transmit one or more communication(s) to be received at the service maintainer device.

At operation 1304, the root cause processing apparatus 200 includes means such as the notification management circuitry 214, root cause identification circuitry 212, data event detection circuitry 210, communications circuitry 208, input/output circuitry 206, and/or processor 202, or a combination thereof, to transmit at least one notification to the at least one service maintainer device associated with the at least one root cause computing system service. In some embodiments, the root cause processing apparatus 200 generates and/or transmits the notification over one or more communication network(s) to cause the notification to be received and/or displayed (e.g., by rendering one or more user interface(s)) at the service maintainer device via one or more specially configured native application(s) executed on the service maintainer device, browser application(s) executed on the service maintainer device, messaging application(s) executed on the service maintainer device, and/or the like. Alternatively or additionally, in some embodiments the root cause processing apparatus 200 transmits the notification via an automatically initiated phone call utilizing text-to-speech or other pre-recorded and/or automated voice information.

In some embodiments, the notification comprises information identifying the root cause computing system service as likely the cause of the data event. Additionally or alternatively, in some embodiments the notification requests or otherwise indicates that the root cause computing system service should undergo maintenance to resolve the data event. In some embodiments, the notification includes additional information helpful to the user of the service maintainer device in determining the severity of the data event, what the data event is, the impact of the data event on other computing system services in the computing environment, and/or the like. In this regard, upon receiving the notification, the user of the service maintainer device may initiate or otherwise cause initiation of maintenance of the root cause computing system service.

Figure 14:
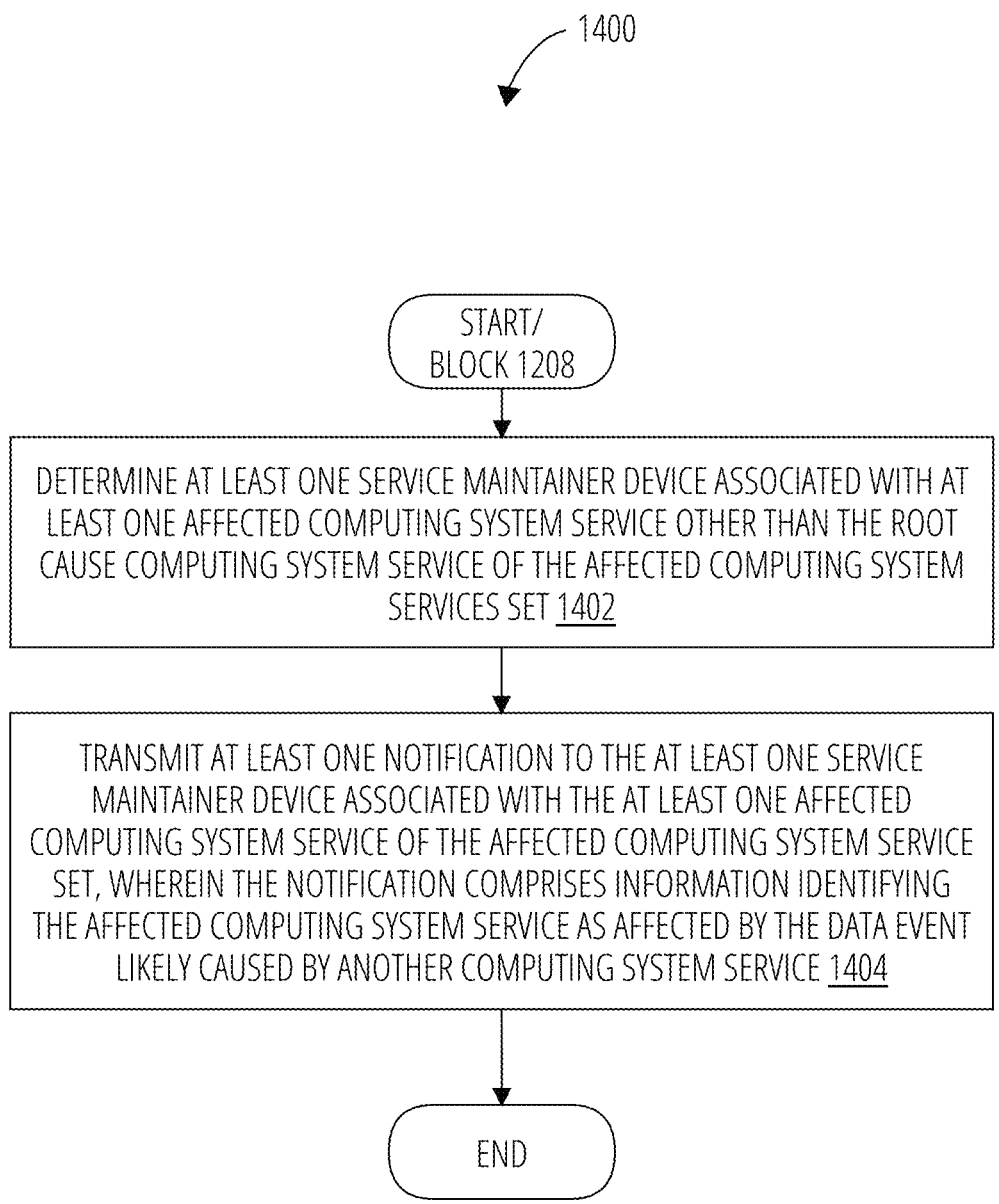
FIG. 14 illustrates a process 1400 for transmitting at least one notification a non-root cause affected computing system service in accordance with at least some embodiments of the present disclosure.

FIG. 14 illustrates a process 1400 for transmitting at least one notification a non-root cause affected computing system service in accordance with at least some embodiments of the present disclosure. Specifically, FIG. 14 depicts example operations of an example process 1400. In some embodiments, the process 1400 is embodied by computer program code stored on a non-transitory computer-readable storage medium of a computer program product configured for execution to perform the process as depicted and described. Alternatively or additionally, in some embodiments, the process 1400 is performed by one or more specially configured computing devices, such as the root cause processing apparatus 200 alone or in communication with one or more other component(s), device(s), system(s), and/or the like. In this regard, in some such embodiments, the root cause processing apparatus 200 is specially configured by computer-coded instructions (e.g., computer program instructions) stored thereon, for example in the memory 204 and/or another component depicted and/or described herein and/or otherwise accessible to the root cause processing apparatus 200, for performing the operations as depicted and described. In some embodiments, the root cause processing apparatus 200 is in communication with one or more external apparatus(es), system(s), device(s), and/or the like, to perform one or more of the operations as depicted and described. In some embodiments, the root cause processing apparatus 200 is in communication with one or more external apparatus(es), system(s), device(s), and/or the like, to perform one or more of the operations as depicted and described. For example, the root cause processing apparatus 200 in some embodiments is in communication with an end-user computing device(s), client device(s), and/or the like. For purposes of simplifying the description, the process 1400 is described as performed by and from the perspective of the root cause processing apparatus 200.

The process 1400 begins at operation 1402. In some embodiments, the process 1400 begins after one or more operations depicted and/or described with respect to any one of the other processes described herein. For example, in some embodiments as depicted, the process 1400 begins after execution of operation 1208. In this regard, some or all of the process 1400 may replace or supplement one or more blocks depicted and/or described with respect to any of the processes described herein. Upon completion of the process 1400, the flow of operations may terminate. Additionally or alternatively, as depicted, upon completion of the process 1400 in some embodiments, flow may return to one or more operation(s) of another process. It will be appreciated that, in some embodiments, the process 1400 embodies a sub-process of one or more other process(es) depicted and/or described herein, for example the process 1200.

At operation 1402, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine at least one service maintainer device associated with at least one affected computing system service other than the at least one root cause computing system service of the affected computing system service set. In some embodiments, the root cause processing apparatus 200 determines a service maintainer device for each affected computing system service dependent on and/or that is depended on by the at least one root cause computing system service. As described herein, in some embodiments, the root cause processing apparatus 200 determines the at least one service maintainer device from a data repository that includes data linking one or more service maintainer device(s) with each particular computing system service of a computing environment, such that the at least one service maintainer device(s) is/are determined based at least in part on identifier(s) that identifies the affected computing system service.

In some embodiments, the root cause processing apparatus 200 determines particular information identifying and/or utilized to communicate with the service maintainer device over one or more communications network(s). For example, in some embodiments, the root cause processing apparatus 200 determines IP address information associated with the service maintainer device corresponding to the at least one root cause computing system service. Alternatively or additionally, the root cause processing apparatus 200 in some embodiments determines a phone number, email address, or other third-party application device usable to transmit one or more communication(s) to be received at the service maintainer device.

At operation 1404, the root cause processing apparatus 200 includes means such as the notification management circuitry 214, root cause identification circuitry 212, data event detection circuitry 210, communications circuitry 208, input/output circuitry 206, and/or processor 202, or a combination thereof, to transmit at least one notification to the at least one service maintainer device associated with the at least one affected computing system service other than the at least one root cause computing system service. In some embodiments, the root cause processing apparatus 200 generates and/or transmits the notification over one or more communication network(s) to cause the notification to be received and/or displayed (e.g., by rendering via one or more user interface(s)) at the service maintainer device via one or more specially configured native application(s) executed on the service maintainer device, browser application(s) executed on the service maintainer device, messaging application(s) executed on the service maintainer device, and/or the like. Alternatively or additionally, in some embodiments, the root cause processing apparatus 200 transmits the notification via an automatically initiated phone call utilizing text-to-speech or other pre-recorded and/or automated voice information.

In some embodiments, the notification(s) each comprise information indicating that the affected computing system service is affected by a data event likely caused by another computing system service (e.g., at least one of the at least one root cause computing system service). Additionally or alternatively, in some embodiments, the notification indicates that maintenance of the affected computing system service is not required at the current time and/or is determined as not determined likely to resolve the data event at this time. In this regard, resources (including human resources, financial resources, and computing resources) that would otherwise be expended in attempting to resolve the data event are conserved.

Figure 15A:
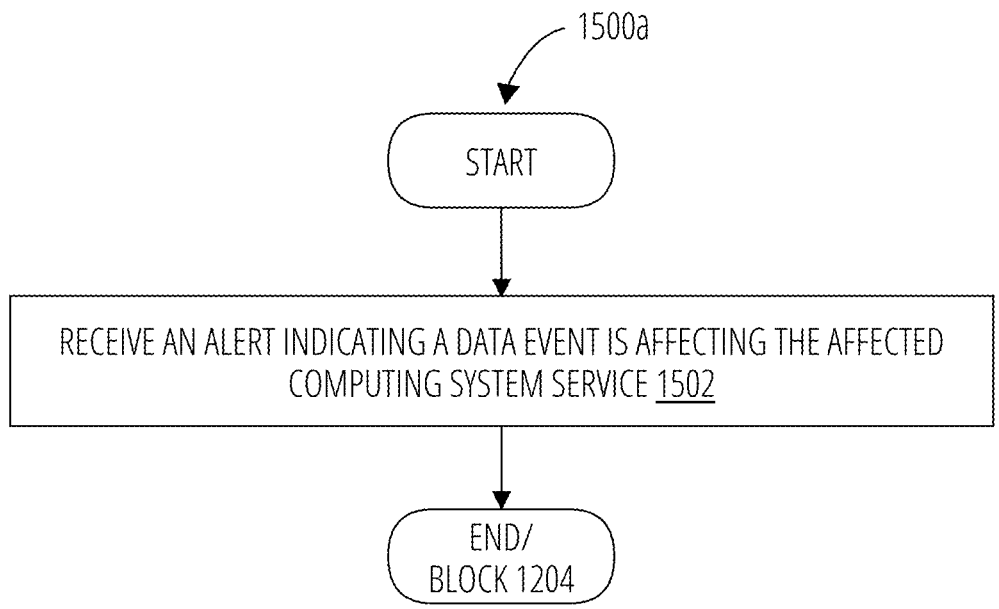
FIG. 15A illustrates a process 1500a for detecting a data event based at least in part on a received alert in accordance with at least some embodiments of the present disclosure.

FIG. 15A illustrates a process 1500a for detecting a data event based at least in part on a received alert in accordance with at least some embodiments of the present disclosure. Specifically, FIG. 15A depicts example operations of an example process 1500a. In some embodiments, the process 1500a is embodied by computer program code stored on a non-transitory computer-readable storage medium of a computer program product configured for execution to perform the process as depicted and described. Alternatively or additionally, in some embodiments, the process 1500a is performed by one or more specially configured computing devices, such as the root cause processing apparatus 200 alone or in communication with one or more other component(s), device(s), system(s), and/or the like. In this regard, in some such embodiments, the root cause processing apparatus 200 is specially configured by computer-coded instructions (e.g., computer program instructions) stored thereon, for example in the memory 204 and/or another component depicted and/or described herein and/or otherwise accessible to the root cause processing apparatus 200, for performing the operations as depicted and described. In some embodiments, the root cause processing apparatus 200 is in communication with one or more external apparatus(es), system(s), device(s), and/or the like, to perform one or more of the operations as depicted and described. In some embodiments, the root cause processing apparatus 200 is in communication with one or more external apparatus(es), system(s), device(s), and/or the like, to perform one or more of the operations as depicted and described. For example, the root cause processing apparatus 200 in some embodiments is in communication with an end-user computing device(s), client device(s), and/or the like. For purposes of simplifying the description, the process 1500a is described as performed by and from the perspective of the root cause processing apparatus 200.

The process 1500a begins at operation 1502. In some embodiments, the process 1500a begins after one or more operations depicted and/or described with respect to any one of the other processes described herein. In this regard, some or all of the process 1500a may replace or supplement one or more blocks depicted and/or described with respect to any of the processes described herein. Upon completion of the process 1500a, the flow of operations may terminate. Additionally or alternatively, as depicted, upon completion of the process 1500a in some embodiments, flow may return to one or more operation(s) of another process, for example operation 1204 as depicted and described with respect to the process 1200. It will be appreciated that, in some embodiments, the process 1500a embodies a sub-process of one or more other process(es) depicted and/or described herein, for example the process 1200.

At operation 1502, the root cause processing apparatus 200 includes means such as the notification management circuitry 214, root cause identification circuitry 212, data event detection circuitry 210, communications circuitry 208, input/output circuitry 206, and/or processor 202, or a combination thereof, to receive an alert indicating the data event is affecting the affected computing system service. In some embodiments, the alert comprises a data transmission from the affected computing system service itself. For example, in some embodiments, each computing system service monitors its own operations, and transmits an alert indicating a data event in circumstances where the computing system service determines that operations are not normal. Alternatively or additionally, in some embodiments the alert comprises a transmission from one or more other computing device(s) and/or computing system(s) that monitors one or more computing system service(s) for data event(s).

Figure 15B:
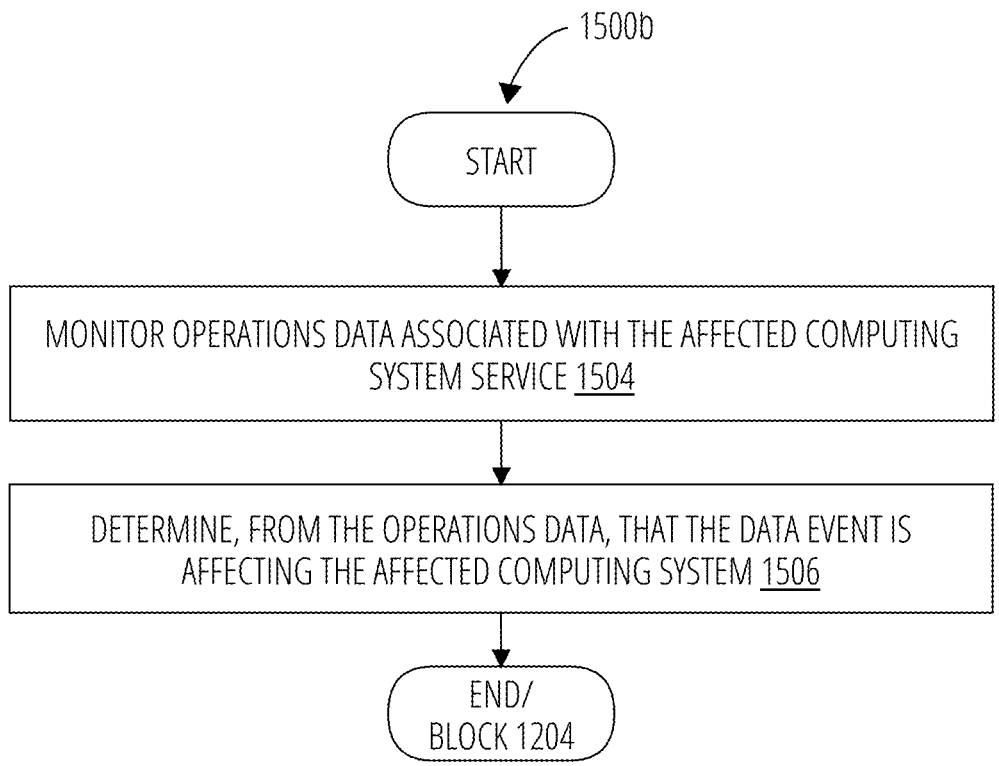
FIG. 15B illustrates a process 1500b for detecting a data event based at least in part on a detected alert in accordance with at least some embodiments of the present disclosure.

FIG. 15B illustrates a process 1500b for detecting a data event based at least in part on a detected alert in accordance with at least some embodiments of the present disclosure. Specifically, FIG. 15B depicts example operations of an example process 1500b. In some embodiments, the process 1500b is embodied by computer program code stored on a non-transitory computer-readable storage medium of a computer program product configured for execution to perform the process as depicted and described. Alternatively or additionally, in some embodiments, the process 1500b is performed by one or more specially configured computing devices, such as the root cause processing apparatus 200 alone or in communication with one or more other component(s), device(s), system(s), and/or the like. In this regard, in some such embodiments, the root cause processing apparatus 200 is specially configured by computer-coded instructions (e.g., computer program instructions) stored thereon, for example in the memory 204 and/or another component depicted and/or described herein and/or otherwise accessible to the root cause processing apparatus 200, for performing the operations as depicted and described. In some embodiments, the root cause processing apparatus 200 is in communication with one or more external apparatus(es), system(s), device(s), and/or the like, to perform one or more of the operations as depicted and described. In some embodiments, the root cause processing apparatus 200 is in communication with one or more external apparatus(es), system(s), device(s), and/or the like, to perform one or more of the operations as depicted and described. For example, the root cause processing apparatus 200 in some embodiments is in communication with an end-user computing device(s), client device(s), and/or the like. For purposes of simplifying the description, the process 1500b is described as performed by and from the perspective of the root cause processing apparatus 200.

The process 1500b begins at operation 1504. In some embodiments, the process 1500a begins after one or more operations depicted and/or described with respect to any one of the other processes described herein. In this regard, some or all of the process 1500a may replace or supplement one or more blocks depicted and/or described with respect to any of the processes described herein. Upon completion of the process 1500a, the flow of operations may terminate. Additionally or alternatively, as depicted, upon completion of the process 1500a in some embodiments, flow may return to one or more operation(s) of another process, for example operation 1204 as depicted and described with respect to the process 1200. It will be appreciated that, in some embodiments, the process 1500a embodies a sub-process of one or more other process(es) depicted and/or described herein, for example the process 1200.

At operation 1504, the root cause processing apparatus 200 includes means such as the notification management circuitry 214, root cause identification circuitry 212, data event detection circuitry 210, communications circuitry 208, input/output circuitry 206, and/or processor 202, or a combination thereof, to monitor operations data associated with the affected computing system service. In some such embodiments, the operations data represents particular monitored metric(s), parameter(s), and/or other value(s) associated with performance of a particular computing system service. Non-limiting examples of operations data includes uptime, computing resource usage and/or system load, response time, and/or the like.

At operation 1506, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine, from the operations data, that the data event is affecting the affected computing system service. In some embodiments, the root cause processing apparatus 200 determines whether one or more portion(s) of the operations data exceeds a threshold indicating the computing system service is affected by one or more data event(s). Alternatively or additionally, in some embodiments, the root cause processing apparatus 200 determines whether one or more portion(s) of operations data falls outside of normal operating range(s). The threshold(s) and/or operating range(s) in some embodiments are determined based at least in part on historical operation data of the computing system service when not affected by a data event and/or historical operations data of the computing system service when affected by a data event or multiple data event(s). In other embodiments, such threshold(s) and/or normal operation range(s) is/are predetermined.

Figure 16:
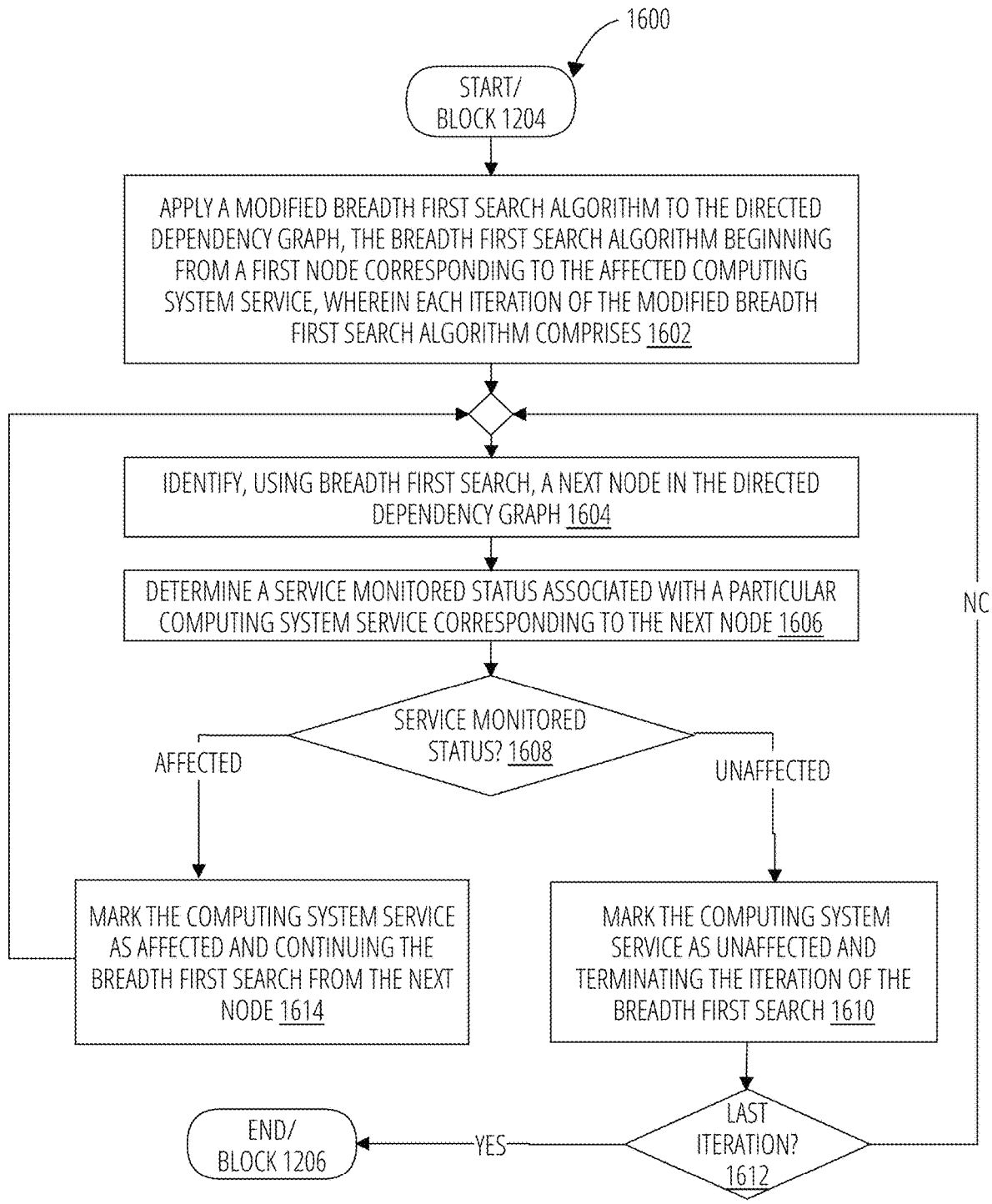
FIG. 16 illustrates a process 1600 for determining an affected services subgraph of a directed dependency graph utilizing a modified breadth first search in accordance with at least some example embodiments of the present disclosure.

FIG. 16 illustrates a process 1600 for determining an affected services subgraph of a directed dependency graph utilizing a modified breadth first search in accordance with at least some example embodiments of the present disclosure. Specifically, FIG. 16 depicts example operations of an example process 1600. In some embodiments, the process 1600 is embodied by computer program code stored on a non-transitory computer-readable storage medium of a computer program product configured for execution to perform the process as depicted and described. Alternatively or additionally, in some embodiments, the process 1600 is performed by one or more specially configured computing devices, such as the root cause processing apparatus 200 alone or in communication with one or more other component(s), device(s), system(s), and/or the like. In this regard, in some such embodiments, the root cause processing apparatus 200 is specially configured by computer-coded instructions (e.g., computer program instructions) stored thereon, for example in the memory 204 and/or another component depicted and/or described herein and/or otherwise accessible to the root cause processing apparatus 200, for performing the operations as depicted and described. In some embodiments, the root cause processing apparatus 200 is in communication with one or more external apparatus(es), system(s), device(s), and/or the like, to perform one or more of the operations as depicted and described. In some embodiments, the root cause processing apparatus 200 is in communication with one or more external apparatus(es), system(s), device(s), and/or the like, to perform one or more of the operations as depicted and described. For example, the root cause processing apparatus 200 in some embodiments is in communication with an end-user computing device(s), client device(s), and/or the like. For purposes of simplifying the description, the process 1600 is described as performed by and from the perspective of the root cause processing apparatus 200.

The process 1600 begins at operation 1602. In some embodiments, the process 1600 begins after one or more operations depicted and/or described with respect to any one of the other processes described herein. In this regard, some or all of the process 1600 may replace or supplement one or more blocks depicted and/or described with respect to any of the processes described herein. Upon completion of the process 1600, the flow of operations may terminate. Additionally or alternatively, as depicted, upon completion of the process 1600 in some embodiments, flow may return to one or more operation(s) of another process, for example operation 1204 as depicted and described with respect to the process 1200. It will be appreciated that, in some embodiments, the process 1600 embodies a sub-process of one or more other process(es) depicted and/or described herein, for example the process 1200.

At operation 1602, the root cause processing apparatus 200 includes means such as the notification management circuitry 214, root cause identification circuitry 212, data event detection circuitry 210, communications circuitry 208, input/output circuitry 206, and/or processor 202, or a combination thereof, to apply a modified breadth first search algorithm to the directed dependency graph. In some embodiments, the modified breadth first search algorithm utilizes one or more iteration(s) of breadth first search to determine a service monitored status for each computing system service represented by a node in the services directed dependency graph. In some embodiments, the modified breadth first search centrality algorithm begins with an initial iteration at a first node corresponding to the affected computing system service for which the alert of the data event was received. In this regard, the modified breadth first search algorithm begins with the node corresponding to the affected computing system service as the root of the search. The operations of the modified breadth first search algorithm are described herein with respect to operations 1604-1616.

At operation 1604, the root cause processing apparatus 200 includes means such as the notification management circuitry 214, root cause identification circuitry 212, data event detection circuitry 210, communications circuitry 208, input/output circuitry 206, and/or processor 202, or a combination thereof, to identify, using breadth first search, a next node in the directed dependency graph. It will be appreciated by one having ordinary skill in the art how to traverse the directed dependency graph utilizing breadth first search beginning from the node associated with the affected computing system service for which the alert was detected. In this regard, each subsequent iteration propagates at node(s) of the same level as the current iteration before processing node(s) of a sub-level, as described herein At operation 1606, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine a service monitored status associated with a particular computing system service corresponding to the next node. In some embodiments, the root cause processing apparatus 200 requests the service monitored status from the particular computing system service represented by the selected next node. In some such embodiments, the root cause processing apparatus 200 pings the particular computing system service to determine the service monitored status associated with the particular computing system service based at least in part on the received response data. In other embodiments, the root cause processing apparatus 200 requests the service monitored status for the particular computing system service represented by the selected next node from a central system and/or other computing device that determines and/or maintains the service monitored status for each computing system service in the computing environment.

At operation 1608, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine whether the service monitored status indicates an affected status or an unaffected status. In circumstances where the service monitored status indicates an affected status, flow continues to operation 1610. In circumstances where the service monitored status indicates an unaffected status, flow continues operation 1612.

At operation 1610, the root cause processing apparatus 200 includes means such as the notification management circuitry 214, root cause identification circuitry 212, data event detection circuitry 210, communications circuitry 208, input/output circuitry 206, and/or processor 202, or a combination thereof, to mark the computing system service as affected. For example, in some embodiments, the root cause processing apparatus 200 marks the node and/or corresponding computing system service being processed as associated with an affected status. The affected status in some embodiments is stored as one or more data flag(s) associated with the node. Upon marking the affected status, the root cause processing apparatus 200 continues the breadth first search from the next node. For each node marked with an affected status, the breadth first search continues by processing the node upon completion of the current iteration of breadth first search and any queued iterations.

Alternatively, at operation 1612, the root cause processing apparatus 200 includes means such as the notification management circuitry 214, root cause identification circuitry 212, data event detection circuitry 210, communications circuitry 208, input/output circuitry 206, and/or processor 202, or a combination thereof, to mark the computing system service as unaffected. For example, in some embodiments, the root cause processing apparatus 200 marks the node and/or corresponding computing system service being processed as associated with an unaffected status. The unaffected status in some embodiments is stored as one or more data flag(s) associated with the node. For each node marked with an unaffected status, the breadth first search continues by processing remaining node(s) in the current iteration and/or subsequently queued iterations without any additional processing of the node marked as unaffected.

Upon marking the unaffected status, the root cause processing apparatus 200 continues the breadth first search without queueing an additional iteration from the node marked with the unaffected status. At operation 1614, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine whether any additional iteration(s) of breadth first search are queued for one or more node(s). In circumstances where one or more iteration(s) of breadth first search remains to be performed, flow returns to operation 1604 and the root cause processing apparatus 200 continues to determine a new next node for processing. In circumstances where all iterations are completed or no nodes remain for processing, the modified breadth first search algorithm ends and the flow ends.

Figure 17:
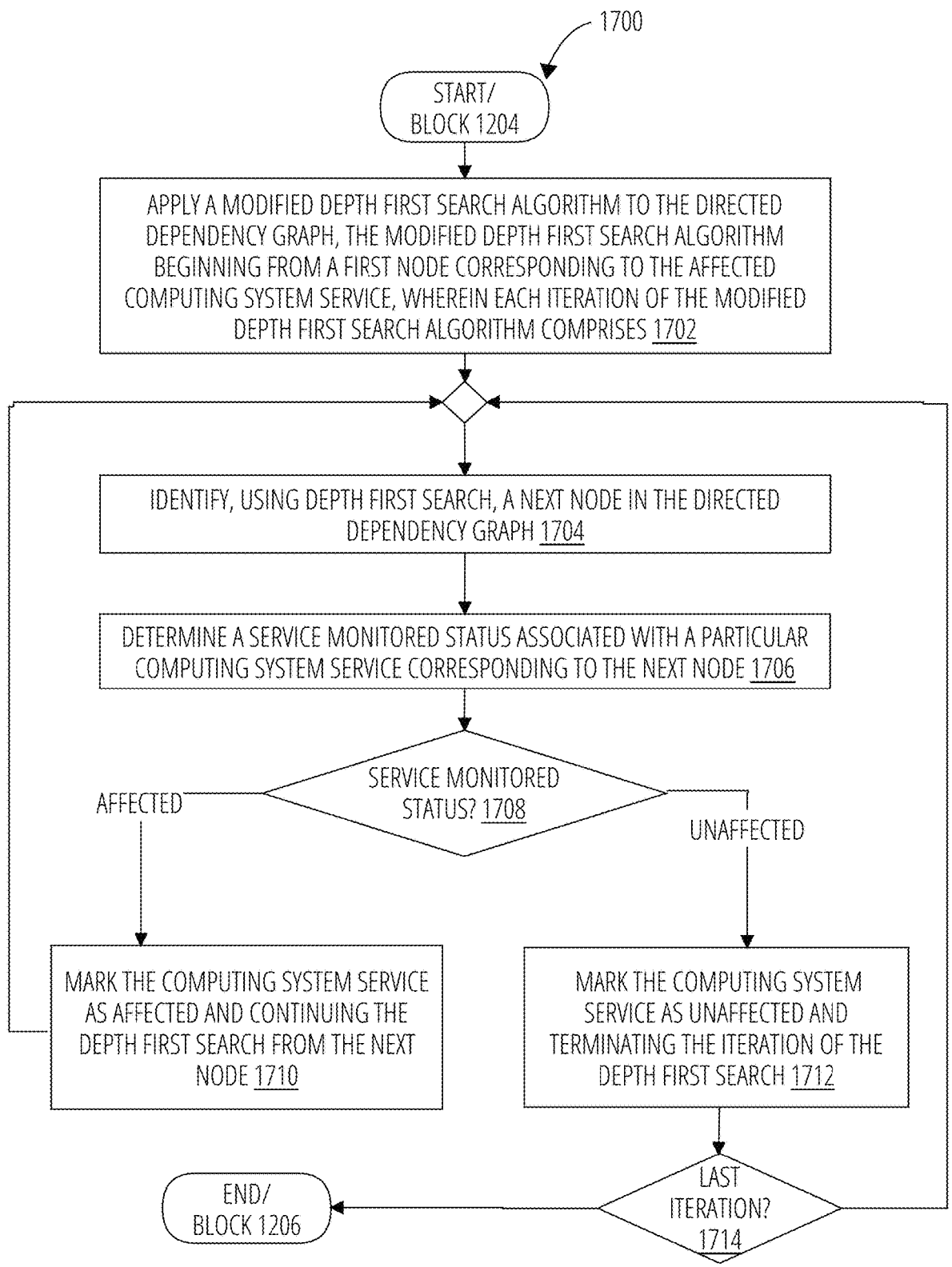
FIG. 17 illustrates a process 1700 for determining an affected services subgraph of a directed dependency graph utilizing a modified depth first search in accordance with at least some example embodiments of the present disclosure.

FIG. 17 illustrates a process 1700 for determining an affected services subgraph of a directed dependency graph utilizing a modified depth first search in accordance with at least some example embodiments of the present disclosure. Specifically, FIG. 17 depicts example operations of an example process 1700. In some embodiments, the process 1700 is embodied by computer program code stored on a non-transitory computer-readable storage medium of a computer program product configured for execution to perform the process as depicted and described. Alternatively or additionally, in some embodiments, the process 1700 is performed by one or more specially configured computing devices, such as the root cause processing apparatus 200 alone or in communication with one or more other component(s), device(s), system(s), and/or the like. In this regard, in some such embodiments, the root cause processing apparatus 200 is specially configured by computer-coded instructions (e.g., computer program instructions) stored thereon, for example in the memory 204 and/or another component depicted and/or described herein and/or otherwise accessible to the root cause processing apparatus 200, for performing the operations as depicted and described. In some embodiments, the root cause processing apparatus 200 is in communication with one or more external apparatus(es), system(s), device(s), and/or the like, to perform one or more of the operations as depicted and described. In some embodiments, the root cause processing apparatus 200 is in communication with one or more external apparatus(es), system(s), device(s), and/or the like, to perform one or more of the operations as depicted and described. For example, the root cause processing apparatus 200 in some embodiments is in communication with an end-user computing device(s), client device(s), and/or the like. For purposes of simplifying the description, the process 1700 is described as performed by and from the perspective of the root cause processing apparatus 200.

The process 1700 begins at operation 1702. In some embodiments, the process 1700 begins after one or more operations depicted and/or described with respect to any one of the other processes described herein. In this regard, some or all of the process 1700 may replace or supplement one or more blocks depicted and/or described with respect to any of the processes described herein. Upon completion of the process 1700, the flow of operations may terminate. Additionally or alternatively, as depicted, upon completion of the process 1700 in some embodiments, flow may return to one or more operation(s) of another process, for example operation 1204 as depicted and described with respect to the process 1200. It will be appreciated that, in some embodiments, the process 1700 embodies a sub-process of one or more other process(es) depicted and/or described herein, for example the process 1200.

At operation 1702, the root cause processing apparatus 200 includes means such as the notification management circuitry 214, root cause identification circuitry 212, data event detection circuitry 210, communications circuitry 208, input/output circuitry 206, and/or processor 202, or a combination thereof, to apply a modified depth first search algorithm to the directed dependency graph. In some embodiments, the modified depth first search algorithm utilizes one or more iteration(s) of depth first search to determine a service monitored status for each computing system service represented by a node in the directed dependency graph. In some embodiments, the modified depth first search algorithm begins with an initial iteration at a first node corresponding to the affected computing system service for which the alert of the data event was received. In this regard, the modified depth first search algorithm begins with the node corresponding to the affected computing system service as the root of the search. The operations of the modified depth first search algorithm are described herein with respect to operations 1704-1714.

At operation 1704, the root cause processing apparatus 200 includes means such as the notification management circuitry 214, root cause identification circuitry 212, data event detection circuitry 210, communications circuitry 208, input/output circuitry 206, and/or processor 202, or a combination thereof, to identify, using depth first search, a next node in the directed dependency graph. It will be appreciated by one having ordinary skill in the art how to traverse the directed dependency graph utilizing depth first search beginning from the node associated with the affected computing system service for which the alert was detected. In this regard, each subsequent iteration propagates at node(s) of the next level as compared to the current iteration before processing the remaining node(s) of the current level, as described herein At operation 1706, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine a service monitored status associated with a particular computing system service corresponding to the next node. In some embodiments, the root cause processing apparatus 200 requests the service monitored status from the particular computing system service represented by the selected next node. In some such embodiments, the root cause processing apparatus 200 pings the particular computing system service to determine the service monitored status associated with the particular computing system service based at least in part on the received response data. In other embodiments, the root cause processing apparatus 200 requests the service monitored status for the particular computing system service represented by the selected next node from a central system and/or other computing device that determines and/or maintains the service monitored status for each computing system service in the computing environment.

At operation 1708, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine whether the service monitored status indicates an affected status or an unaffected status. In circumstances where the service monitored status indicates an affected status, flow continues to operation 1710. In circumstances where the service monitored status indicates an unaffected status, flow continues operation 1712.

At operation 1710, the root cause processing apparatus 200 includes means such as the notification management circuitry 214, root cause identification circuitry 212, data event detection circuitry 210, communications circuitry 208, input/output circuitry 206, and/or processor 202, or a combination thereof, to mark the computing system service as affected. For example, in some embodiments, the root cause processing apparatus 200 marks the node and/or corresponding computing system service being processed as associated with an affected status. The affected status in some embodiments is stored as one or more data flag(s) associated with the node. Upon marking the affected status, the root cause processing apparatus 200 continues the depth first search from the next node. For each node marked with an affected status, the depth first search continues by processing the node upon completion of the current iteration of depth first search and any queued iterations.

Alternatively, at operation 1712, the root cause processing apparatus 200 includes means such as the notification management circuitry 214, root cause identification circuitry 212, data event detection circuitry 210, communications circuitry 208, input/output circuitry 206, and/or processor 202, or a combination thereof, to mark the computing system service as unaffected. For example, in some embodiments, the root cause processing apparatus 200 marks the node and/or corresponding computing system service being processed as associated with an unaffected status. The unaffected status in some embodiments is stored as one or more data flag(s) associated with the node. For each node marked with an unaffected status, the depth first search continues by processing remaining node(s) in the current iteration and/or subsequently queued iterations without any additional processing of the node marked as unaffected.

Upon marking the unaffected status, the root cause processing apparatus 200 continues the depth first search without queueing an additional iteration from the node marked with the unaffected status. At operation 1614, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine whether any additional iteration(s) of depth first search are queued for one or more node(s). In circumstances where one or more iteration(s) of depth first search remains to be performed, flow returns to operation 1604 and the root cause processing apparatus 200 continues to determine a new next node for processing. In circumstances where all iterations are completed or no nodes remain for processing, the modified depth first search algorithm ends and the flow ends.

Figure 18:
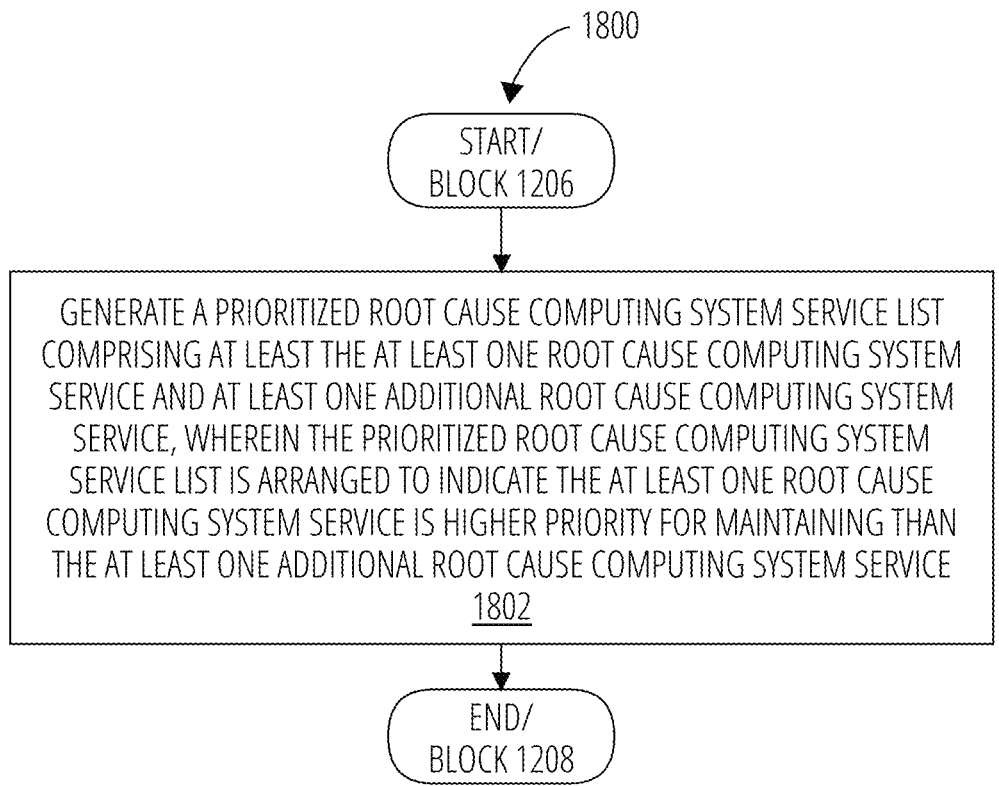
FIG. 18 illustrates a process 1800 for generating a prioritized root cause computing system service list in accordance with at least some example embodiments of the present disclosure.

FIG. 18 illustrates a process 1800 for generating a prioritized root cause computing system service list in accordance with at least some example embodiments of the present disclosure. Specifically, FIG. 18 depicts example operations of an example process 1800. In some embodiments, the process 1800 is embodied by computer program code stored on a non-transitory computer-readable storage medium of a computer program product configured for execution to perform the process as depicted and described. Alternatively or additionally, in some embodiments, the process 1800 is performed by one or more specially configured computing devices, such as the root cause processing apparatus 200 alone or in communication with one or more other component(s), device(s), system(s), and/or the like. In this regard, in some such embodiments, the root cause processing apparatus 200 is specially configured by computer-coded instructions (e.g., computer program instructions) stored thereon, for example in the memory 204 and/or another component depicted and/or described herein and/or otherwise accessible to the root cause processing apparatus 200, for performing the operations as depicted and described. In some embodiments, the root cause processing apparatus 200 is in communication with one or more external apparatus(es), system(s), device(s), and/or the like, to perform one or more of the operations as depicted and described. In some embodiments, the root cause processing apparatus 200 is in communication with one or more external apparatus(es), system(s), device(s), and/or the like, to perform one or more of the operations as depicted and described. For example, the root cause processing apparatus 200 in some embodiments is in communication with an end-user computing device(s), client device(s), and/or the like. For purposes of simplifying the description, the process 1800 is described as performed by and from the perspective of the root cause processing apparatus 200.

The process 1800 begins at operation 1802. In some embodiments, the process 1800 begins after one or more operations depicted and/or described with respect to any one of the other processes described herein. For example, in some embodiments as depicted, the process 1800 begins after execution of operation 1206. In this regard, some or all of the process 1800 may replace or supplement one or more blocks depicted and/or described with respect to any of the processes described herein. Upon completion of the process 1800, the flow of operations may terminate. Additionally or alternatively, as depicted, upon completion of the process 1800 in some embodiments, flow may return to one or more operation(s) of another process, such as operation 1208. It will be appreciated that, in some embodiments, the process 1800 embodies a sub-process of one or more other process(es) depicted and/or described herein, for example the process 1200.

At operation 1802, the root cause processing apparatus 200 includes means such as the notification management circuitry 214, root cause identification circuitry 212, data event detection circuitry 210, communications circuitry 208, input/output circuitry 206, and/or processor 202, or a combination thereof, to generate a prioritized root cause computing system service list. In some such embodiments, the prioritized root cause computing system service list comprises at least the root cause computing system service and at least one additional root cause computing system service embodying a next-most-likely root cause computing system service. Additionally, in some such embodiments, the prioritized root cause computing system service list is arranged to indicate the root cause computing system service is higher priority for maintaining than the at least one additional root cause computing system service identified previously.

In some embodiments, the root cause processing apparatus 200 generates the prioritized root cause computing system service list by performing multiple iterations of a centrality algorithm. In some embodiments, each iteration of the centrality algorithm identifies at least one root cause computing system service to add to the prioritized root cause computing system service list. In some embodiments, each iteration of the centrality algorithm performs with one or more modifications based at least in part on previous iteration(s) of the centrality algorithm. For example, in some embodiments the centrality algorithm is modified to adjust weights assigned to each directed edge associated with non-selected nodes in the affected services subgraph after each iteration based at least in part on the selected node for each iteration.

In some embodiments, the prioritized root cause computing system service list includes a plurality of root cause computing system services. In some such embodiments, each identified root cause computing system service in the prioritized root cause computing system service list is assigned the same probability as being the actual root cause of a particular data event and/or is assigned the same priority for maintaining. For example, in some embodiments, the top three most likely root cause computing system services are identified using the centrality algorithm.

Alternatively or additionally, in some embodiments, the prioritized root cause computing system service list includes the root cause computing system service identified first as the most probable actual root cause of the data event, and one or more additional root cause computing system service(s) that are each determined as next-most-likely root cause computing system service(s). In this regard, in some such embodiments the first root cause computing system service in the prioritized root cause computing system service list corresponds to the most-likely actual root cause of the data event, the second root cause computing system service corresponds to a next-most-likely root cause computing system service determined to be second most probable as the actual root cause of the data event, the third root cause computing system service corresponds to the next-most-likely root cause computing system service as the next most probable actual root cause of the data event after the second root cause computing system service. It will be appreciated that the root cause processing apparatus 200 may continue this process to generate the prioritized root cause computing system service list comprising any number of identified root cause computing system service(s) over any number of iterations.

Figure 19:
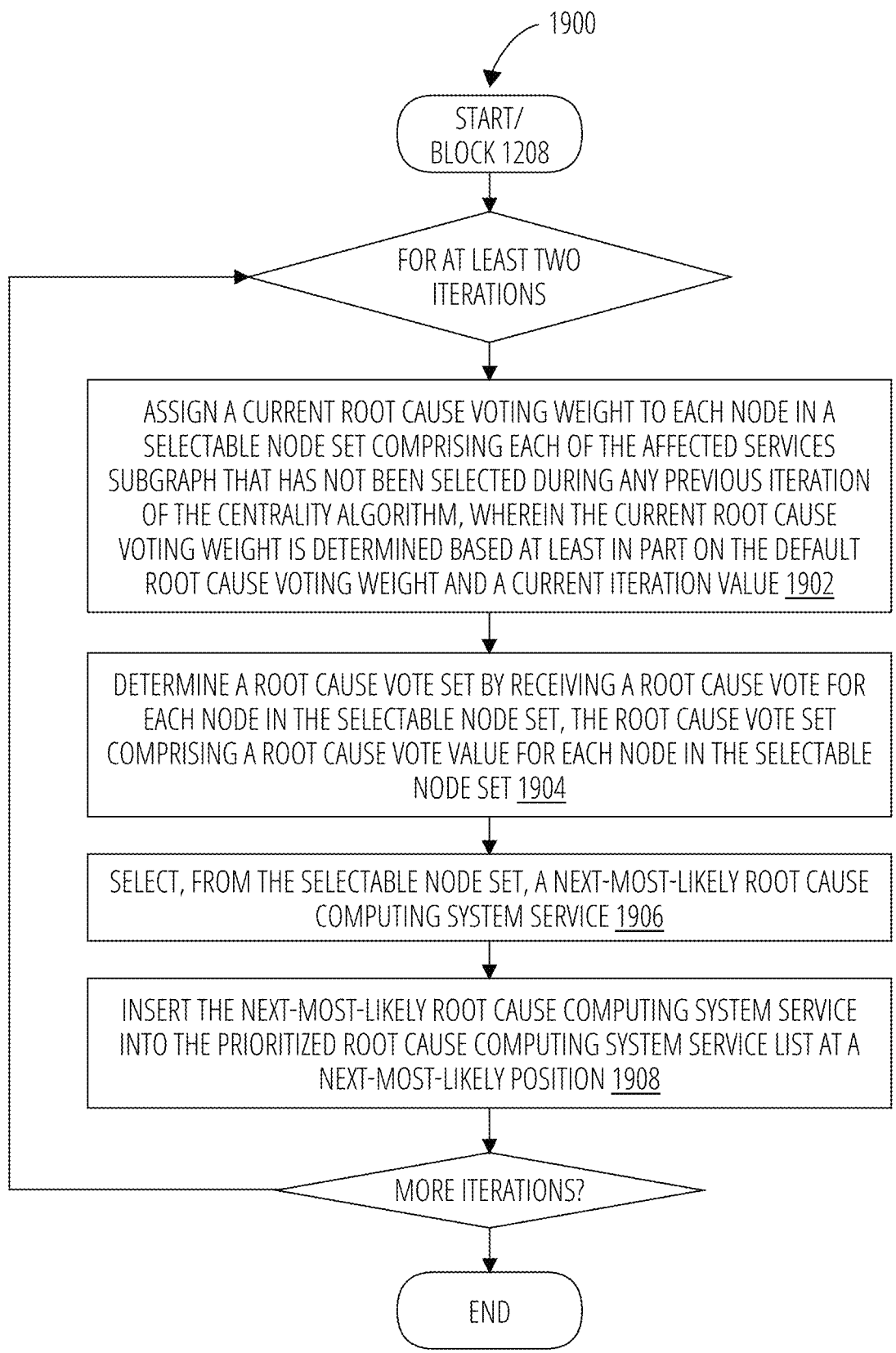
FIG. 19 illustrates a process 1900 for using a centrality algorithm to generate a prioritized root cause computing system service list comprising at least one next-most-likely root cause computing system service in accordance with at least some example embodiments of the present disclosure.

FIG. 19 illustrates a process 1900 for using a centrality algorithm to generate a prioritized root cause computing system service list comprising at least one next-most-likely root cause computing system service in accordance with at least some example embodiments of the present disclosure. Specifically, FIG. 19 depicts example operations of an example process 1900 for utilizing a modified centrality algorithm utilizing root cause voting weights. In some embodiments, the process 1900 is embodied by computer program code stored on a non-transitory computer-readable storage medium of a computer program product configured for execution to perform the process as depicted and described. Alternatively or additionally, in some embodiments, the process 1900 is performed by one or more specially configured computing devices, such as the root cause processing apparatus 200 alone or in communication with one or more other component(s), device(s), system(s), and/or the like. In this regard, in some such embodiments, the root cause processing apparatus 200 is specially configured by computer-coded instructions (e.g., computer program instructions) stored thereon, for example in the memory 204 and/or another component depicted and/or described herein and/or otherwise accessible to the root cause processing apparatus 200, for performing the operations as depicted and described. In some embodiments, the root cause processing apparatus 200 is in communication with one or more external apparatus(es), system(s), device(s), and/or the like, to perform one or more of the operations as depicted and described. In some embodiments, the root cause processing apparatus 200 is in communication with one or more external apparatus(es), system(s), device(s), and/or the like, to perform one or more of the operations as depicted and described. For example, the root cause processing apparatus 200 in some embodiments is in communication with an end-user computing device(s), client device(s), and/or the like. For purposes of simplifying the description, the process 1900 is described as performed by and from the perspective of the root cause processing apparatus 200.

The process 1900 begins at operation 1902. In some embodiments, the process 1900 begins after one or more operations depicted and/or described with respect to any one of the other processes described herein. For example, in some embodiments as depicted, the process 1900 begins after execution of operation 1208. In this regard, some or all of the process 1900 may replace or supplement one or more blocks depicted and/or described with respect to any of the processes described herein. Upon completion of the process 1900, the flow of operations may terminate. Additionally or alternatively, as depicted, upon completion of the process 1900 in some embodiments, flow may return to one or more operation(s) of another process. It will be appreciated that, in some embodiments, the process 1800 embodies a sub-process of one or more other process(es) depicted and/or described herein, for example the process 1200.

In some embodiments, the root cause processing apparatus 200 performs the operations of process 1900 for a plurality of iterations. In this regard, the root cause processing apparatus 200 performs the operations centrality algorithm for at least two iterations. It will be appreciated that each iteration in some embodiments determines a next-most-likely root cause computing system service for inserting into the prioritized root cause computing system service list.

At operation 1902, the root cause processing apparatus 200 includes means such as the notification management circuitry 214, root cause identification circuitry 212, data event detection circuitry 210, communications circuitry 208, input/output circuitry 206, and/or processor 202, or a combination thereof, to assign a current root cause voting weight to each node in a selectable node set. In some embodiments, the selectable node set includes each node in the affected services subgraph that has not yet been selected during any previous iteration of the centrality algorithm. In this regard, in some embodiments, the root cause processing apparatus 200 marks each node identified as a root cause computing system service/next-most-likely root cause computing system service as selected using one or more data flag(s) to prevent such node(s) from being selected during subsequent iteration(s).

In some embodiments, the root cause processing apparatus 200 predetermines a current root cause voting weight assigned to each node. Additionally or alternatively, in some embodiments, the root cause processing apparatus 200 calculates the current root cause voting weight based at least in part on a default root cause voting weight, a current iteration value, and a delta value. For example, in some such embodiments, the root cause processing apparatus 200 calculates the current root cause voting weight by decrementing the default root cause voting weight by the delta value multiplied by the current iteration value.

At operation 1904, the root cause processing apparatus 200 includes means such as the notification management circuitry 214, root cause identification circuitry 212, data event detection circuitry 210, communications circuitry 208, input/output circuitry 206, and/or processor 202, or a combination thereof, to determine a root cause vote set. In some embodiments, the root cause vote set is determined by receiving a root cause vote for each node in the selectable node set. The root cause vote set comprising a root cause vote value for each node in the selectable node set. In this regard, each node of the selectable node set casts a root cause vote of a particular value based on one or more directed edges terminating at the node, with the total value of all such root cause votes of a particular node embodying the root cause vote value for that particular node. For example, in some embodiments, the root cause processing apparatus 200 aggregates the current root cause weight for each directed edge originating from a particular node to generate the root cause vote value for that particular node.

At operation 1906, the root cause processing apparatus 200 includes means such as the notification management circuitry 214, root cause identification circuitry 212, data event detection circuitry 210, communications circuitry 208, input/output circuitry 206, and/or processor 202, or a combination thereof, to select, from the selectable node set, a next-most-likely root cause computing system service. In some embodiments, the root cause processing apparatus 200 selects the next-most-likely root cause computing system service by determining the node(s) of the selectable node set that are associated with the highest root cause vote value. In this regard, it will be appreciated that the root cause processing apparatus 200 may identify a plurality of next-most-likely root cause computing system services in circumstances where two or more nodes of the selectable node set are associated with the same highest root cause vote value in the current iteration.

At operation 1908, the root cause processing apparatus 200 includes means such as the notification management circuitry 214, root cause identification circuitry 212, data event detection circuitry 210, communications circuitry 208, input/output circuitry 206, and/or processor 202, or a combination thereof, to insert the next-most-likely root cause computing system service into the prioritized root cause computing system service list at a next-most-likely position. In this regard, the root cause processing apparatus 200 determines the next-most-likely position representing the next open position in the prioritized root cause computing system service list, such that the determined next-most-likely root cause computing system service is added to the prioritized root cause computing system service list at a position indicating the next-most-likely root cause computing system service(s) as less probable to be the root cause computing system service than those added to the prioritized root cause computing system service list at earlier position(s) in the prioritized root cause computing system service list. The root cause processing apparatus 200 may continue to add to the prioritized root cause computing system service list to indicate the computing system service(s) determined likely to be the root cause of a data event with decreasing probability for each iteration.

The root cause processing apparatus 200 may repeat the operations 1902-1908 for any number of iteration(s) defined by one or more threshold value(s). For example, in some embodiments, the root cause processing apparatus 200 maintains a threshold number of iterations to be performed before the centrality algorithm terminates. In other embodiments, the root cause processing apparatus 200 maintains a threshold number of identified root cause computing system services and/or next-most-likely root cause computing system services to be added to the prioritized root cause computing system service list before the centrality algorithm terminates.

CONCLUSION

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising:
    at least one processor; and
    at least one memory having computer-coded instructions stored thereon that, when executed by the at least one processor, causes the apparatus to:
    apply, at a time that an alert corresponding to a data event is detected associated with at least one affected computing system service, a system operations graph searching algorithm to a directed dependency graph corresponding to the computing environment to determine a plurality of affected computing system services associated with the data event,
    wherein the directed dependency graph comprises:
        a first node set comprising a node representing each computing system service in the plurality of interdependent computing system services; and
        a first directed edge set comprising, for each node pair in the first node set, a directed edge defined between a selected node of the node pair and a dependency node of the selected node;
    generate, based at least in part on the directed dependency graph, an affected services subgraph associated with the at least one affected computing system service, the affected services subgraph comprising:
        a second node set comprising each node representing each affected computing system service of the plurality of affected computing system services; and
        a second directed edge set comprising, for each node in the second node set, each directed edge from the node to a dependency node corresponding to an affected computing system service of the plurality of affected computing system services; and
    determine at least one root cause computing system service by applying a centrality algorithm to the affected services subgraph.

2. The apparatus according to claim 1, the apparatus further caused to:
    detect the data event associated with the at least one affected computing system service of the plurality of interdependent computing system services.

3. The apparatus according to claim 1, wherein the at least one root cause computing system service comprises a single root cause computing system service identified as most likely an actual root cause of the data event.

4. The apparatus according to claim 1, the apparatus further caused to:
    determine at least one service maintainer device associated with the at least one root cause computing system service; and
    transmit at least one notification to the at least one service maintainer device associated with the at least one root cause computing system service, wherein the notification comprises information identifying the at least one root cause computing system service as likely the cause of the data event.

5. The apparatus according to claim 1, the apparatus further caused to:
    transmit at least one notification to a service maintainer device associated with at least one affected computing system service of the plurality of affected computing system services, wherein the notification comprises information identifying the affected computing system service as affected by the data event likely caused by another computing system service.

6. The apparatus according to claim 1, the apparatus further caused to:
    receive an alert indicating the data event is affecting the affected computing system service.

7. The apparatus according to claim 1, wherein to detect the data event the apparatus is caused to:
    monitor operations data associated with the affected computing system service; and
    determine, from the operations data, that the data event is affecting the affected computing system service.

8. The apparatus according to claim 1, wherein to apply the system operations graph searching algorithm to the directed dependency graph corresponding to the computing environment the apparatus is configured to:
    apply a modified breadth first search algorithm to the directed dependency graph, the breadth first search algorithm beginning from a first node corresponding to the affected computing system service, wherein each iteration of the modified breadth first search algorithm comprises:

identify, using breadth first search, a next node in the directed dependency graph;

determine a service monitored status associated with a particular computing system service corresponding to the next node; and based on the service monitored status associated with the computing system service corresponding to the next node:

in a circumstance where the computing system service represents an affected status, mark the computing system service as affected and continuing the breadth first search from the next node; or in a circumstance where the computing system service represents an unaffected status, mark the computing system service as normal and terminating the iteration of the breadth first search.

9. The apparatus according to claim 1, wherein to apply the system operations graph searching algorithm to the directed dependency graph corresponding to the computing environment the apparatus is caused to:

apply a modified depth first search algorithm to the directed dependency graph, the modified depth first search algorithm beginning from a first node corresponding to the affected computing system service, wherein each iteration of the modified depth first search algorithm comprises:

identify, using depth first search, a next node in the directed dependency graph;

determine a service monitored status associated with a particular computing system service corresponding to the next node; and based on the service monitored status associated with the computing system service corresponding to the next node:

in a circumstance where the computing system service represents an affected status, mark the computing system service as affected and continuing the depth first search from the next node; or in a circumstance where the computing system service represents an unaffected status, mark the computing system service as normal and terminating the iteration of the depth first search.

10. The apparatus according to claim 1, wherein each directed edge in the second directed edge set is associated with an edge weight representing a probability that a child node of the directed edge indicates a parent node of the directed edge as corresponding to the at least one root cause computing system service.

11. The apparatus according to claim 1, wherein to generate the affected services subgraph the apparatus is configured to extract the affected services subgraph from the directed dependency graph based at least in part on the plurality of affected computing system services.

12. The apparatus according to claim 1, wherein the centrality algorithm comprises a vote rank algorithm, a betweenness algorithm, a page rank algorithm, or a degree rank algorithm.

13. The apparatus according to claim 1, the apparatus further caused to:

generate a prioritized root cause computing system service list comprising at least the at least one root cause computing system service and at least one additional root cause computing system service, wherein the prioritized root cause computing system service list is arranged to indicate the at least one root cause computing system service is higher priority for maintaining than the at least one additional root cause computing system service.

14. The apparatus according to claim 13, wherein the centrality algorithm utilizes a default root cause voting weight, and wherein to generate the prioritized root cause computing system service list by applying the centrality algorithm to the affected services subgraph the apparatus is caused to:

for at least two iterations:

assign a current root cause voting weight to each node in a selectable node set comprising each of the affected services subgraph that has not been selected during any previous iteration of the centrality algorithm, wherein the current root cause voting weight is determined based at least in part on the default root cause voting weight and a current iteration value;

determine a root cause vote set by receiving a root cause vote for each node in the selectable node set, the root cause vote set comprising a root cause vote value for each node in the selectable node set;

select, from the selectable node set, a next-most-likely root cause computing system service; and insert the next-most-likely root cause computing system service into the prioritized root cause computing system service list at a next-most-likely position.

15. A computer-implemented method for identifying a root cause computing system service withing a computing system environment comprised of a plurality of interdependent computing system services, the computer-implemented method comprising:

applying, at a time that a data event is detected associated with at least one affected computing system service, a system operations graph searching algorithm to a directed dependency graph corresponding to the computing environment to determine a plurality of affected computing system services associated with the data event, wherein the directed dependency graph comprises:

a first node set comprising a node representing each computing system service in the plurality of interdependent computing system services; and a first directed edge set comprising, for each node pair in the first node set, a directed edge defined between a selected node of the node pair and a dependency node of the selected node;

generating, based at least in part on the directed dependency graph, an affected services subgraph associated with the at least one affected computing system service, the affected services subgraph comprising:

a second node set comprising each node representing each affected computing system service in the plurality of affected computing system services; and a second directed edge set comprising, for each node in the second node set, each directed edge from the node to a dependency node corresponding to an affected computing system service of the plurality of affected computing system services; and determining at least one root cause computing system service by applying a centrality algorithm to the affected services subgraph.

16. The computer-implemented method according to claim 15, the computer-implemented method further comprising:

detecting the data event associated with the at least one affected computing system service of the plurality of interdependent computing system services.

17. The computer-implemented method according to claim 15, wherein applying the system operations graph searching algorithm to the directed dependency graph corresponding to the computing environment comprises:
applying a modified breadth first search algorithm to the directed dependency graph, the breadth first search algorithm beginning from a first node corresponding to the affected computing system service, wherein each iteration of the modified breadth first search algorithm comprises:
identifying, using breadth first search, a next node in the directed dependency graph;
determining a service monitored status associated with a particular computing system service corresponding to the next node; and
based on the service monitored status associated with the computing system service corresponding to the next node:
in a circumstance where the computing system service represents an affected status, marking the computing system service as affected and continuing the breadth first search from the next node; or
in a circumstance where the computing system service represents an unaffected status, marking the computing system service as normal and terminating the iteration of the breadth first search.

18. The computer-implemented method according to claim 15, wherein applying the system operations graph searching algorithm to the directed dependency graph corresponding to the computing environment comprises:
applying a modified depth first search algorithm to the directed dependency graph, the modified depth first search algorithm beginning from a first node corresponding to the affected computing system service, wherein each iteration of the modified depth first search algorithm comprises:
identifying, using depth first search, a next node in the directed dependency graph;
determining a service monitored status associated with a particular computing system service corresponding to the next node; and
based on the service monitored status associated with the computing system service corresponding to the next node:
in a circumstance where the computing system service represents an affected status, marking the computing system service as affected and continuing the depth first search from the next node; or
in a circumstance where the computing system service represents an unaffected status, marking the computing system service as normal and terminating the iteration of the depth first search.

19. The computer-implemented method according to claim 15, wherein the centrality algorithm utilizes a default root cause voting weight, and wherein generating a prioritized root cause computing system service list by applying the centrality algorithm to the affected services subgraph comprises:
for at least two iterations:
assign a current root cause voting weight to each node in a selectable node set comprising each of the affected services subgraph that has not been selected during any previous iteration of the centrality algorithm, wherein the current root cause voting weight is determined based at least in part on the default root cause voting weight and a current iteration value;
determining a root cause vote set by receiving a root cause vote for each node in the selectable node set, the root cause vote set comprising a root cause vote value for each node in the selectable node set;
selecting, from the selectable node set, a next-most-likely root cause computing system service; and
inserting the next-most-likely root cause computing system service into the prioritized root cause computing system service list at a next-most-likely position.

20. A computer program product comprising at least one non-transitory computer-readable storage medium, the at least one non-transitory computer-readable storage medium including program code instructions that when executed by at least one processor, configures the computer program product for:
applying, at a time that an alert corresponding to a data event is detected associated with at least one affected computing system service, a system operations graph searching algorithm to a directed dependency graph corresponding to the computing environment to determine a plurality of affected computing system services associated with the data event,
wherein the directed dependency graph comprises:
a first node set comprising a node representing each computing system service in the plurality of interdependent computing system services; and
a first directed edge set comprising, for each node pair in the first node set, a directed edge defined between a selected node of the node pair and a dependency node of the selected node;
generating, based at least in part on the directed dependency graph, an affected services subgraph associated with the at least one affected computing system service, the affected services subgraph comprising:
a second node set comprising each node representing each affected computing system service of the plurality of affected computing system services; and
a second directed edge set comprising, for each node in the second node set, each directed edge from the node to a dependency node corresponding to an affected computing system service of the plurality of affected computing system services; and
determining at least one root cause computing system service by applying a centrality algorithm to the affected services subgraph.

* * * * *